United States Patent
Iino et al.

(10) Patent No.: US 8,786,981 B2
(45) Date of Patent: Jul. 22, 2014

(54) BEARING DEVICE, METHOD OF MANUFACTURING BEARING DEVICE, AND INFORMATION RECORDING/REPRODUCING APPARATUS

(71) Applicant: Seiko Instruments Inc., Chiba (JP)

(72) Inventors: Akihiro Iino, Chiba (JP); Akio Ozawa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 14/053,649

(22) Filed: Oct. 15, 2013

(65) Prior Publication Data

US 2014/0104727 A1    Apr. 17, 2014

(30) Foreign Application Priority Data

Oct. 15, 2012  (JP) ................... 2012-228111
Jul. 4, 2013   (JP) ................... 2013-141133

(51) Int. Cl.
*G11B 17/04*    (2006.01)
*F16C 33/60*    (2006.01)

(52) U.S. Cl.
USPC ....................... 360/98.07; 384/504

(58) Field of Classification Search
CPC .................................. G11B 19/2009
USPC ......... 360/98.07, 99.04, 99.08; 384/504–506, 384/512–517, 519
See application file for complete search history.

(56) References Cited

PUBLICATIONS

Patent Abstracts of Japan, Publication No. 2001-208082, Publication Date Aug. 3, 2001.

*Primary Examiner* — Joseph Feild
*Assistant Examiner* — Gustavo Polo
(74) *Attorney, Agent, or Firm* — Adams & Wilks

(57) ABSTRACT

A first inner ring and a second inner ring respectively include inner ring rolling surfaces formed so that the external radius of inner end portions is smaller than a first separation distance and formed so as to have an external radius that become larger than the first separation distance, and a first outer ring and a second outer ring respectively include outer ring rolling surfaces formed so that the internal radius of outer end portions is larger than a second separation distance and formed so as to have an internal radius that becomes smaller than the second separation distance, and the first outer ring and the second outer ring are formed integrally with each other to form an outer ring.

8 Claims, 14 Drawing Sheets

BEARING DEVICE, METHOD OF MANUFACTURING BEARING DEVICE, AND INFORMATION RECORDING/REPRODUCING APPARATUS

BACKGROUND OF THE INVENTION

1. Field of the Invention

The present invention relates to a bearing device, a method of manufacturing the bearing device, and an information recording/reproducing apparatus.

2. Background Art

In the related art, information recording/reproducing apparatuses, such as hard disks, which make various kinds of information recorded and reproduced with respect to disks (equivalent to a "magnetic recording medium" of the claims), have been known. Generally, information recording/reproducing apparatuses include a head gimbal assembly equipped with a slider that records and reproduces signals with respect to a disk, and an arm (equivalent to a "rotating member" of the claims) having the head gimbal assembly mounted on a tip side. The arm is made rotatable by a bearing device provided on a base end side. By rotating the arm, the slider can be moved to a predetermined position of a disk so as to perform recording and reproducing of signals.

Generally, bearing devices includes a shaft, and a pair of rolling bearings that are inserted into the shaft and are arranged side by side in the axial direction of the shaft. Additionally, the pair of rolling bearings each include an inner ring fixed to the shaft, an outer ring surrounding the inner ring, a reinforcing sleeve that covers the outer ring, and a plurality of rolling elements that are arranged between the inner ring and the outer ring. The arm is externally fitted to the outer ring via the sleeve.

Incidentally, in recent years, in order to cope with further reduction in size, thickness, and cost of the information recording/reproducing apparatuses, further reduction in size, thickness, and cost of bearing devices assembled into the information recording/reproducing apparatuses is required.

Thus, for example, JP-A-2001-208082 discloses a bearing device that includes a pair of outer rings arranged side by side in an axial direction via a spacer and in which the outer rings are formed so as to be thicker than the outer rings of the bearing devices in the related art, and a tolerance ring that fixes the outer rings to each other is provided to eliminate a sleeve.

According to JP-A-2001-208082, the sleeve is eliminated, so that the number of bearing parts can be reduced and the number of assembling steps of the bearings and the manufacturing cost thereof can be reduced, and the outer rings are made thicker, so that it is possible to withstand a high load. Therefore, reduction in size of the bearing device can be realized.

SUMMARY OF THE INVENTION

However, the bearing devices of the related art have the following problems.

In the bearing devices of the related art, when the rotating member is externally fixed and assembled to the outer rings, there is a possibility that the central axes of the pair of outer rings may deviate from each other. Since the relative deviation of the pair of outer rings causes a torque ripple and a torque increase when the rotating member rotates, there is a possibility that poor recording and poor reproducing may occur when recording and reproducing of information are performed between the slider and a magnetic recording medium.

Thus, an object of the invention is to provide a bearing device that can suppress a torque ripple and a torque increase when rotated and can realize reduction in size, weight, and cost, a method of manufacturing the bearing device, and an information recording/reproducing apparatus including the bearing device.

In order to solve the above problems, according to an aspect of the invention, a bearing device includes a shaft; and a pair of rolling bearing portions that are arranged side by side in an axial direction of the shaft. The pair of rolling bearing portions each include an inner ring that is arranged coaxially with a central axis of the shaft; an outer ring that surrounds the inner ring from an outer side of the shaft in a radial direction; and a plurality of rolling elements that are rollably retained between the inner ring and the outer ring. When a separation distance between an innermost portion of the rolling elements in the radial direction and the central axis is defined as a first separation distance and a separation distance between an outermost portion of the rolling elements in the radial direction and the central axis is defined as a second separation distance, the inner rings of the pair of rolling bearing portions each include an inner ring rolling surface formed so that the external radius of an inner end portion in the axial direction is smaller than the first separation distance and formed so as to have an external radius that becomes larger than the first separation distance from an inner side toward an outer side in the axial direction, and the outer rings of the pair of rolling bearing portions each include an outer ring rolling surface formed so that the internal radius of an outer end portion in the axial direction is larger than the second separation distance and formed so as to have an internal radius that becomes smaller than the second separation distance from the outer side toward inner side in the axial direction. The outer rings of the pair of rolling bearing portions are formed integrally with each other.

According to the above aspect of the invention, since the outer rings of the pair of rolling bearing portions are formed integrally with each other, relative deviation does not occur at the central axes of the outer rings of the pair of rolling bearing portions, for example, when a rotating member is externally fitted to the outer rings of the pair of rolling bearing portions. Accordingly, a bearing device that can suppress a torque ripple and a torque increase when rotated can be provided.

Additionally, as the outer rings of the pair of rolling bearing portions are formed integrally with each other, it is unnecessary to provide the spacer, the tolerance ring, the sleeve, or the like unlike the related art. Accordingly, since the number of parts of the bearing device can be reduced, reduction in size, weight, and cost of the bearing device can be realized. Particularly, since the spacer is unnecessary, the pair of rolling bearing portions can be arranged in proximity to each other in the axial direction. This enables reduction in thickness of the bearing device in the axial direction to be realized, and enables reduction in material cost to be realized.

Incidentally, in the related art, in a process of manufacturing a rolling bearing, a plurality of rolling elements are individually inserted between an inner ring and an outer ring and then are equally arranged in a circumferential direction while relatively shifting the central axes of the inner ring and the outer ring in the radial direction and providing a larger gap than the external diameter of the rolling elements between the inner ring and the outer ring. However, according to the above aspect of the invention, the inner rings of the pair of rolling bearing portions each include the inner ring rolling surface formed so that the external radius of the inner end portion in the axial direction is smaller than the first separation distance and formed so as to have the external radius that becomes larger than the first separation distance from the inner side toward the outer side in the axial direction, the rolling elements can be easily placed on the inner ring rolling surface by inserting the rolling elements from the inner end portion in the axial direction in a state where the rolling elements are annularly and equally arranged. Additionally, the outer ring of the pair of rolling bearing portions formed integrally includes the outer ring rolling surface formed so that the internal radius of the outer end portion in the axial direction is larger than the second separation distance and formed so as to have the internal radius that becomes smaller than the second separation distance from the outer side toward the inner side in the axial direction, the rolling elements can be easily placed on the outer ring rolling surface by inserting the rolling elements from the outer end portion in the axial direction in a state where the rolling elements are annularly and equally arranged. Since this makes it unnecessary to provide the related-art complicated operation of equally arranging the plurality of rolling elements in the circumferential direction after the rolling elements are inserted between the inner ring and the outer ring while shifting the inner ring and the outer ring from each other, the rolling bearing portions can be easily formed. Accordingly, reduction in overall cost of the bearing device can be realized.

Additionally, when the rolling elements are inserted between the inner ring and the outer ring while shifting the inner ring and the outer ring from each other as in the related art, the number and size of the rolling elements that can be inserted are limited by the size of a gap between the inner ring and the outer ring. In contrast, according to the above aspect of the invention, as described above, the rolling elements can be placed on the inner ring rolling surface by being inserted from the inner end portion in the axial direction, and the rolling elements can be placed on the outer ring rolling surface by being inserted from the outer end portion in the axial direction. Thus, the rolling elements can be arranged on the inner ring rolling surface and the outer ring rolling surface without being limited in number and/or size thereof due to a gap between the inner ring and the outer ring unlike the related art. Accordingly, the rigidity of the bearing device can be increased.

Additionally, in the aspect of the invention, the outer end portion of the outer ring in the axial direction may be arranged further toward the inner side in the axial direction than an outer end portion of the inner ring in the axial direction.

According to the above aspect of the invention, the axial length of the outer ring can be shortened. This enables further reduction in size, weight, and cost of the bearing device to be realized.

Additionally, in the aspect of the invention, a distance from an imaginary plane including the center of the plurality of rolling elements to the inner end portion of the inner ring in the axial direction may be formed so as to become shorter than a distance from the imaginary plane to an outer end portion of the inner ring in the axial direction.

According to the above aspect of the invention, since the axial length of the inner ring can be shortened, further reduction in size, weight, and cost of the bearing device can be performed. Additionally, since the length of the inner end portion of the inner ring in the axial direction that limits reduction in thickness of the bearing device can be shortened, further reduction in thickness of the bearing device can be realized.

Additionally, in the aspect of the invention, any one inner ring of the inner rings of the pair of rolling bearing portions, and the shaft may be formed integrally with each other.

According to the above aspect of the invention, since the number of parts of the bearing device can be further reduced, and further reduction in size, weight, and cost of the bearing device can be realized. Additionally, since it is not necessary to insert one inner ring out of the inner rings of the pair of rolling bearing portions into the shaft, the number of assembling steps of the bearing device can be reduced, and manufacturing cost can be reduced. Accordingly, further reduction in overall cost of the bearing device can be realized.

Additionally, in the aspect of the invention, the inner ring and the outer ring may be formed by forging.

According to the above aspect of the invention, the inner ring and the outer ring can be formed at low cost using forging, and the number of steps of cutting work can be reduced. Accordingly, reduction in overall cost of the bearing device can be realized.

Additionally, in the aspect of the invention, the bearing device may further include a retainer that is arranged between the inner ring and the outer ring and that is capable of rollably retaining and annularly and equally arranging the plurality of rolling elements. The retainer may include a body portion, and a plurality of claw portion pairs that are erected in the axial direction from the body portion and rollably retain the rolling elements. The body portion may be arranged further toward the inner side in the axial direction than the rolling elements.

According to the above aspect of the invention, since the plurality of claw portion pairs each are erected in the axial direction from the body portion, compared to a case where the plurality of claw portion pairs are inclined with respect to the axial direction, the internal radius of the retainer can be made as large as possible, and the external radius of the retainer can be made as small as possible. Accordingly, the retainer can be reliably kept from interfering with the inner ring and the outer ring, and the bearing device can be reduced in size even in the radial direction.

Additionally, since the body portion of the retainer can be arranged in a dead space provided further toward the inner side in the axial direction than the rolling elements, reduction in size of the bearing device can be prevented from being limited by the body portion of the retainer. This enables the bearing device to be reduced in thickness as much as possible.

Additionally, according to another aspect of the invention, a method of manufacturing the bearing device includes a first inner ring arranging step of inserting a first inner ring out of the inner rings of the pair of rolling bearing portions into the shaft and arranging the first inner ring on one side in the axial direction; a retainer retaining step of making each of a first retainer and a second retainer capable of retaining the rolling elements rollably retain and equally and annularly arrange the plurality of rolling elements; a first rolling element arranging step of inserting the plurality of rolling elements into the first inner ring together with the first retainer from the other side in the axial direction and placing the plurality of rolling elements on the inner ring rolling surface of the first inner ring; an outer ring arranging step of inserting the outer ring into the first inner ring from the other side in the axial direction; a second rolling element arranging step of inserting the plurality of rolling elements together with the second retainer into the outer ring from the other side in the axial direction and placing the plurality of rolling elements on the outer ring rolling surface on the other side in the axial direction; a second inner ring arranging step of inserting a second inner ring out of the inner rings of the pair of rolling bearing portions into the shaft and arranging the second inner ring on the other side in the axial direction; and a preload applying step of fixing the first inner ring and the second inner ring to the shaft while relatively pressing the first inner ring and the second inner ring in the axial direction.

In the related art, in a process of manufacturing a rolling bearing, a plurality of rolling elements are individually inserted between an inner ring and an outer ring and then are equally arranged in a circumferential direction while relatively shifting the central axes of the inner ring and the outer ring in the radial direction and providing a larger gap than the external diameter of the rolling elements between the inner ring and the outer ring. However, according to the above aspect of the invention, after the plurality of rolling elements are annularly and equally arranged in advance in the retainer retaining step, the plurality of rolling elements can be placed on the inner ring rolling surface and the outer ring rolling surface together with the first retainer and the second retainer, in the first rolling element arranging step and the second rolling element arranging step. Since this enables the plurality of rolling elements to be equally arranged at a time, the complicated operation of equally arranging the plurality of rolling elements in the circumferential direction after the rolling elements are inserted between the inner ring and the outer ring while shifting the inner ring and the outer ring from each other is not required. Thus, the rolling bearing portions can be easily formed.

Moreover, since the inner rings of the pair of rolling bearing portions each include the inner ring rolling surface formed so as to have the external radius that becomes larger than the first separation distance from the inner side toward the outer side in the axial direction, the plurality of rolling elements can be easily placed on the inner ring rolling surface without using a jig or the like when being inserted into the first inner ring from the other side (inner side in the axial direction) in the axial direction in the first rolling element arranging step. Additionally, since the outer ring of the pair of rolling bearing portions formed integrally includes the outer ring rolling surface formed so as to have the internal radius that becomes smaller than the second separation distance from the outer side toward the inner side in the axial direction, the plurality of rolling elements can be easily placed on the outer ring rolling surface without using a jig or the like when being inserted into the outer ring from the other side (outer side in the axial direction) in the axial direction in the second rolling element arranging step.

In this way, according to the method of manufacturing the bearing device of the above aspect of the invention, the bearing device can be simply manufactured. Thus, manufacturing cost can be reduced and reduction in overall cost of the bearing device can be realized.

Additionally, according to still another aspect of the invention, an information recording/reproducing apparatus includes the above-described bearing device; a housing that supports one end portion of the bearing device; a rotating member that is externally fitted to the outer rings and rotates around the central axis of the shaft; and a slider that is mounted on the rotating member and performs recording and reproducing of information with respect to a magnetic recording medium.

According to the above aspect of the invention, the bearing device that can suppress a torque ripple and a torque increase when the rotating member rotates and can realize reduction in size, weight, and cost is included. Thus, high efficiency of the information recording/reproducing apparatus and reduction in thickness, weight, and cost thereof can be realized.

Additionally, since the outer rings of the bearing device are formed integrally with each other, weight reduction and high rigidity of the outer ring can be realized. Since this can make the resonant frequency (resonant point) of the bearing device high, the rotating member can be rotated at high speed. Accordingly, high performance of the information recording/reproducing apparatus can be realized.

According to the invention, since the outer rings of the pair of rolling bearing portions are formed integrally with each other, relative deviation does not occur at the central axes of the outer rings of the pair of rolling bearing portions, for example, when a rotating member is externally fitted to the outer rings of the pair of rolling bearing portions. Accordingly, a bearing device that can suppress a torque ripple and a torque increase when rotated can be provided.

Additionally, as the outer rings of the pair of rolling bearing portions are formed integrally with each other, it is unnecessary to provide the spacer, the tolerance ring, the sleeve, or the like unlike the related art. Accordingly, since the number of parts of the bearing device can be reduced, reduction in size, weight, and cost of the bearing device can be realized. Particularly, since the spacer is unnecessary, the pair of rolling bearing portions can be arranged in proximity to each other in the axial direction. This enables reduction in thickness of the bearing device in the axial direction to be realized, and enables reduction in material cost to be realized.

Incidentally, in the related art, in a process of manufacturing a rolling bearing, a plurality of rolling elements are individually inserted between an inner ring and an outer ring and then are equally arranged in a circumferential direction while relatively shifting the central axes of the inner ring and the outer ring in the radial direction and providing a larger gap than the external diameter of the rolling elements between the inner ring and the outer ring. However, according to the invention, the inner rings of the pair of rolling bearing portions each include the inner ring rolling surface formed so that the external radius of the inner end portion in the axial direction is smaller than the first separation distance and formed so as to have the external radius that becomes larger than the first separation distance from the inner side toward the outer side in the axial direction, the rolling elements can be easily placed on the inner ring rolling surface by inserting the rolling elements from the inner end portion in the axial direction in a state where the rolling elements are annularly and equally arranged. Additionally, the outer ring of the pair of rolling bearing portions formed integrally includes the outer ring rolling surface formed so that the internal radius of the outer end portion in the axial direction is larger than the second separation distance and formed so as to have the internal radius that becomes smaller than the second separation distance from the outer side toward the inner side in the axial direction, the rolling elements can be easily placed on the outer ring rolling surface by inserting the rolling elements from the outer end portion in the axial direction in a state where the rolling elements are annularly and equally arranged. Since this makes it unnecessary to the related-art complicated operation of equally arranging the plurality of rolling elements in the circumferential direction after the rolling elements are inserted between the inner ring and the outer ring while shifting the inner ring and the outer ring from each other, the rolling bearing portions can be easily formed. Accordingly, reduction in overall cost of the bearing device can be realized.

Additionally, when the rolling elements are inserted between the inner ring and the outer ring while shifting the inner ring and the outer ring from each other as in the related art, the number and size of the rolling elements that can be inserted are limited by the size of a gap between the inner ring and the outer ring. In contrast, according to the invention, as described above, the rolling elements can be placed on the inner ring rolling surface by being inserted from the inner end portion in the axial direction, and the rolling elements can be placed on the outer ring rolling surface by being inserted from the outer end portion in the axial direction. Thus, the rolling elements can be arranged on the inner ring rolling surface and the outer ring rolling surface without being limited in number and/or size thereof due to a gap between the inner ring and the outer ring unlike the related art. Accordingly, the rigidity of the bearing device can be increased.

DETAILED DESCRIPTION OF THE INVENTION

A bearing device, a method of manufacturing the bearing device, and an information recording/reproducing apparatus related to a first embodiment will be described below. In addition, the bearing device and the method of manufacturing the bearing device related to the first embodiment will be described below after the information recording/reproducing apparatus related to an embodiment is described.

Information Recording/Reproducing Apparatus

Figure 1:
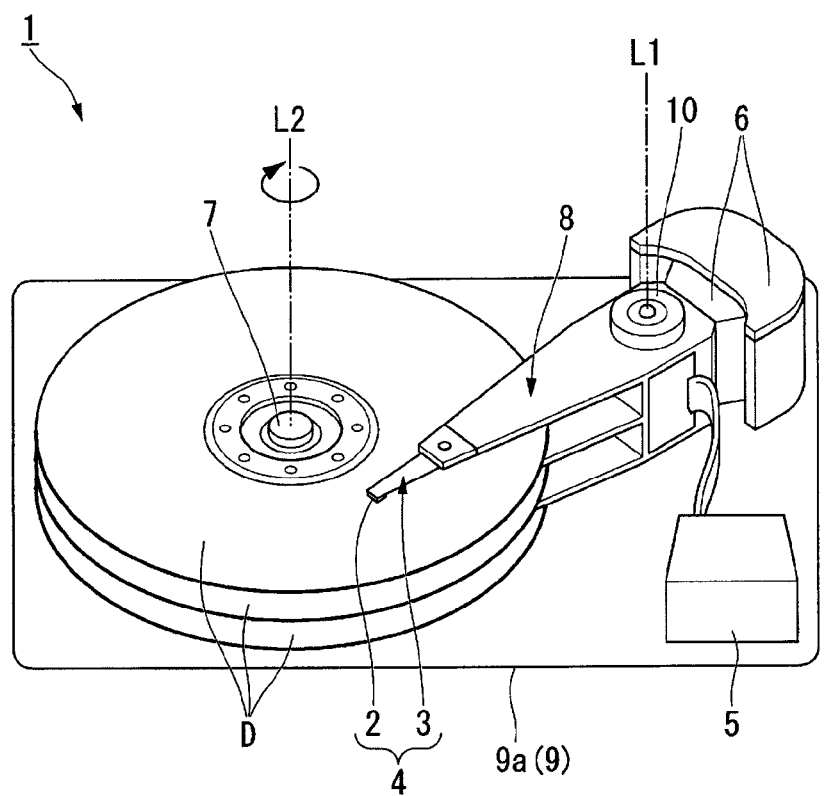
FIG. 1 is a perspective view of an information recording/reproducing apparatus related to an embodiment.

FIG. 1 is a perspective view of an information recording/reproducing apparatus 1 related to the embodiment.

As shown in FIG. 1, the information recording/reproducing apparatus 1 is an apparatus that performs writing and reading with respect to a disk (magnetic recording medium) D having a recording layer. The information recording/reproducing apparatus 1 includes an arm (rotating member) 8, a head gimbal assembly 4 that is supported on the tip side of the arm 8, a slider 2 that is mounted on the tip of the head gimbal assembly 4, an actuator (VCM: voice coil motor) 6 that moves the head gimbal assembly 4 in a scannable manner, a spindle motor 7 that rotates the disk D, a control unit 5 that supplies a current modulated according to information to the slider 2, and a housing 9 that houses these respective components therein.

The housing 9 is made of, for example, metallic materials, such as aluminum, iron, or stainless steel, is formed in the shape of a box having an opening portion at an upper portion thereof, and is constituted by a bottom portion 9a having a quadrangular shape in plan view, and a peripheral wall (not shown) that is erected perpendicularly from a peripheral edge portion of the bottom portion 9a. A housing recess that houses the above-described respective components is formed inside the housing 9 surrounded by the peripheral wall. The spindle motor 7 is attached to the substantial center of the bottom portion 9a, and the disk D is detachably fixed by fitting the center hole of the disk to the spindle motor 7.

A bearing device 10 is arranged at a side of the disk D. One end portion of the bearing device 10 is supported by the bottom portion 9a of the housing 9. The arm 8 is externally fitted and anchored to an outer peripheral surface of the bearing device 10. A base end portion of the arm 8 is connected to the above-described actuator 6. Additionally, the arm 8 extends parallel to the surface of the disk D from the base end side toward the tip side.

The head gimbal assembly 4 is connected to the tip of the arm 8. The head gimbal assembly 4 includes a suspension 3, and the slider 2 that is mounted on the tip of the suspension 3 and arranged opposite to the surface of the disk D. The slider 2 includes a recording element that performs writing (recording) of information to the disk D, and a reproducing element that performs reading (reproducing) of information from the disk D.

In the information recording/reproducing apparatus 1 configured as described above, in order to perform recording or reproducing of information, first, the spindle motor 7 is driven to rotate the disk D around a central axis L2 of the disk D. Additionally, the actuator 6 is driven to rotate the arm 8 with the bearing device 10 as a rotation center. This enables the slider 2 arranged at the tip of the head gimbal assembly 4 to move to respective parts of the surface of the disk D in a scannable manner. Also, the recording or reproducing of information with respect to the disk D can be performed by driving the recording element or the reproducing element of the slider 2.

Bearing Device of First Embodiment

Figure 2:
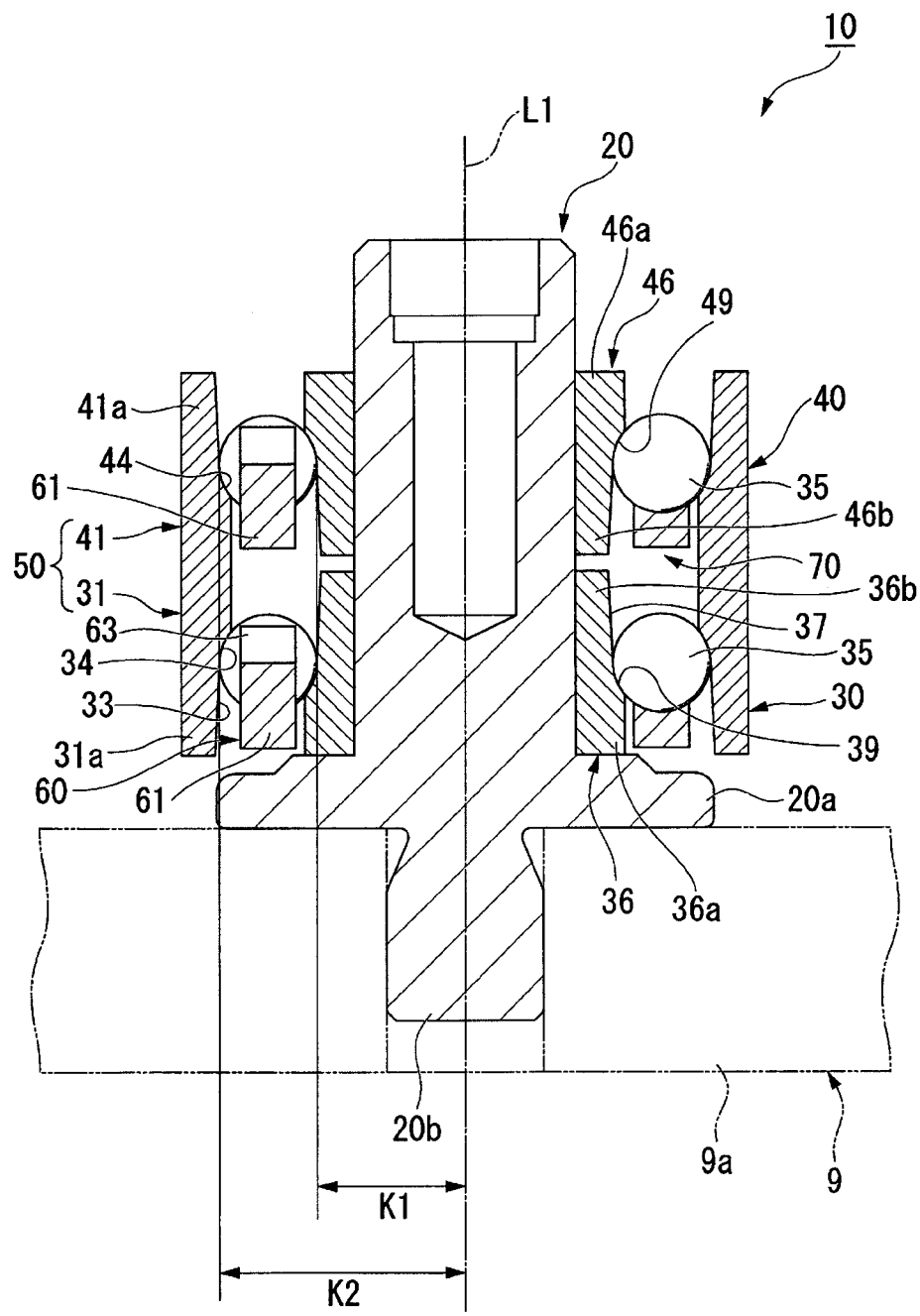
FIG. 2 is a side cross-sectional view of a bearing device related to a first embodiment.

FIG. 2 is a side cross-sectional view of the bearing device 10 related to the first embodiment. In addition, the housing 9 and the bottom portion 9a of the housing 9 are shown by two-dot chain lines in FIG. 2. A direction along the axis (that is, the axis of a shaft 20; hereinafter referred to as a "central axis L1") of the bearing device 10 is hereinafter referred to as an "axial direction". Additionally, a bottom portion 9a side (that is, a lower side in FIG. 2) of the housing 9 shown in FIG. 1 in the axial direction is referred to as "one side", and an opening side (that is, an upper side in FIG. 2) of the housing 9 in the axial direction is referred to as the "other side". Additionally, an inner side of a pair of rolling bearing portions 30 and 40 in the axial direction is referred to as an "inner side in the axial direction", and an outer side of the pair of rolling bearing portions 30 and 40 in the axial direction is referred to as an "outer side in the axial direction". Additionally, a direction orthogonal to the central axis L1 is referred to as a "radial direction", and a direction circulating around the central axis L1 is referred to as a "circumferential direction".

As shown in FIG. 2, the bearing device 10 related to the first embodiment includes the shaft 20 erected from the bottom portion 9a of the housing 9, and the pair of rolling bearing portions 30 and 40 arranged side by side in the axial direction of the shaft 20.

The shaft 20, which is a member having a substantially columnar shape extending along the central axis L1, is formed of, for example, metallic materials, such as aluminum, iron, or stainless steel. A portion of the shaft 20 on the bottom portion 9a side of the housing 9 is defined as a base end portion, and a portion of the shaft opposite to the bottom portion in the axial direction is defined as a tip portion.

A flange portion 20a whose diameter is made larger than the diameter of the shaft 20 and a diameter-reduced portion 20b whose diameter is made smaller than the diameter of the shaft 20 are continuously provided in the base end portion of the shaft 20 in this order from the other side to one side in the axial direction. The diameter-reduced portion 20b is formed with a male thread (not shown) that is threadedly attached to a female thread (not shown) formed in the bottom portion 9a of the housing 9. Also, the shaft 20 is erected from the bottom portion 9a of the housing 9 by the threaded attachment. In this case, as the flange portion 20a comes into contact with the bottom portion 9a of the housing 9, the shaft 20 is positioned in the height direction.

Rolling Bearing Portion

The pair of rolling bearing portions 30 and 40 are arranged side by side in the axial direction in the shaft 20, the first rolling bearing portion 30 out of the pair of rolling bearing portions 30 and 40 is arranged on one side of the shaft 20 in the axial direction, and the second rolling bearing portion 40 is arranged on the other side of the shaft 20 in the axial direction.

First Rolling Bearing Portion

The first rolling bearing portion 30 includes a first inner ring 36 that is arranged coaxially with the central axis L1 of the shaft 20, a first outer ring 31 that surrounds the first inner ring 36 from the outer side of the shaft 20 in the radial direction, a plurality of rolling elements 35 that are rollably retained between the first inner ring 36 and the first outer ring 31, and a first retainer 60 that rollably, annularly, and equally arranges the plurality of rolling elements 35.

In addition, hereinafter, the separation distance between an innermost portion of the plurality of rolling elements 35 in the radial direction and the central axis L1 is defined as a first separation distance K1, and the separation distance between an outermost portion of the plurality of rolling elements 35 in the radial direction and the central axis L1 is defined as a second separation distance K2.

First Inner Ring

The first inner ring 36 is a substantially cylindrical member made of, for example, metallic materials, such as stainless steel, and is formed, for example by forging, machining, or the like.

The first inner ring 36 is formed such that the external radius of an inner end portion 36b in the axial direction is smaller than the first separation distance K1.

An intermediate portion of an outer peripheral surface 37 of the first inner ring 36 in the axial direction is formed with an inner ring rolling surface 39. The inner ring rolling surface 39 has a side cross-section formed in a circular-arc shape so that the external diameter thereof becomes gradually larger than the first separation distance K1 from the inner side toward the outer side in the axial direction. The inner ring rolling surface 39 is formed over the entire circumference of the outer peripheral surface 37 of the first inner ring 36, and is enabled to abut against the outer surfaces of the plurality of rolling elements 35 arranged annularly.

The internal diameter of the first inner ring 36 is formed with a dimension such that the first inner ring can be inserted into the shaft 20. In the present embodiment, the internal diameter of the first inner ring 36 is formed so as to become slightly larger than the external diameter of the shaft 20. The first inner ring 36 is fixed to one side of the shaft 20 in the axial direction with, for example, an adhesive or the like in a state where the first inner ring is inserted into the shaft 20 and an outer end portion 36a abuts against the flange portion 20a of the shaft 20. In addition, the internal diameter of the first inner ring 36 may be formed so as to become equal to or slightly smaller than the external diameter of the shaft 20. In this case, the first inner ring 36 is inserted into the shaft 20 and press-fitted and fixed thereto.

The first inner ring 36 has an external diameter that becomes larger from the inner side toward the outer side in the axial direction, and has a uniform internal diameter. Accordingly, forging is suitable when the outer shape of the first inner ring 36 is formed. Also, since the number of steps of performing machining can be significantly reduced by cutting the inner ring rolling surface 39 after the outer shape of the first inner ring 36 is formed by forging, manufacturing costs can be reduced.

First Outer Ring

The first outer ring 31, similar to the first inner ring 36, is a substantially cylindrical member made of, for example, metallic materials, such as stainless steel, and is formed, for example by forging, machining, or the like.

The first outer ring 31 is formed such that the internal radius of an outer end portion 31a in the axial direction is larger than the second separation distance K2.

An intermediate portion of an inner peripheral surface 33 of the first outer ring 31 in the axial direction is formed with an outer ring rolling surface 34. The outer ring rolling surface 34 has a side cross-section formed in a circular-arc shape so that the internal diameter thereof becomes gradually smaller than the second separation distance K2 from the outer side toward the inner side in the axial direction. The outer ring rolling surface 34 is formed over the entire circumference of the inner peripheral surface 33 of the first outer ring 31, and is enabled to abut against the outer surfaces of the plurality of rolling elements 35 arranged annularly.

The outer peripheral surface of the first outer ring 31 is formed so as to have a uniform external diameter in the axial direction.

Rolling Element

The rolling elements 35 are spherically formed of a metallic material. The rolling elements 35 are arranged between the outer ring rolling surface 34 of the first outer ring 31 and the inner ring rolling surface 39 of the first inner ring 36, and are adapted to roll along the respective rolling surfaces 34 and 39. Each of the rolling surfaces 34 and 39 is formed so that the curvature radius thereof becomes slightly larger than the curvature radius of the external surfaces of the rolling elements 35. The plurality of rolling elements 35 are rollably, annularly and equally arranged along the circumferential direction by the first retainer 60.

First Retainer

Figure 3:
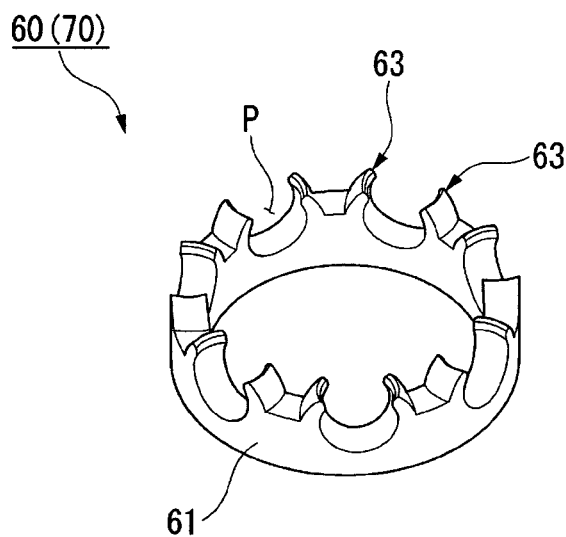
FIG. 3 is a perspective view of a first retainer and a second retainer.

FIG. 3 is a perspective view of the first retainer 60 and the second retainer 70.

The first retainer 60 is a member that rollably retains the rolling elements 35 while rotating around the central axis L1 by the guidance by the first outer ring 31, the first inner ring 36, and the rolling elements 35 and that is made of, for example, resin or the like, and includes a body portion 61 and a plurality of claw portion pairs 63 that are formed integrally with the body portion 61.

As shown in FIG. 3, the body portion 61 is formed in an annular shape that surrounds the first inner ring 36 from the outer side in the radial direction. Spherical ball pockets P that allow the rolling elements 35 to be inserted thereinto are formed in a recessed manner, for example, in seven places at regular intervals in the circumferential direction on the other side of the body portion 61 in the axial direction.

The claw portion pairs 63 are provided on the body portion 61 so as to correspond to the ball pockets P, respectively. The claw portion pairs 63 can rollably retain the rolling elements 35 inserted into the ball pockets P. The pair of claw portions 63 face each other in the circumferential direction with each ball pocket P interposed therebetween, and are erected along the axial direction from the body portion 61, respectively, so as to be curved in a circular-arc shape so that the mutual distance therebetween decreases from a base end toward a tip. As shown in FIG. 2, the plurality of (seven in the present embodiment) rolling elements 35 are retained in a state where the rolling elements are arranged at substantially regular intervals in the circumferential direction by the ball pockets P of the first retainer 60, and are arranged between the first inner ring 36 and the first outer ring 31.

Here, as shown in FIG. 2, the first retainer 60 is formed so that the internal radius thereof becomes larger than the maximum external radius of the first inner ring 36, and the first retainer 60 is formed so that the external radius thereof becomes smaller than the minimum internal radius of the first outer ring 31. By forming the first retainer 60 in this way, the plurality of rolling elements 35 can be arranged between the inner ring rolling surface 39 of the first inner ring 36 and the outer ring rolling surface 34 of the first outer ring 31 without interference between the first retainer 60, and the first inner ring 36 and the first outer ring 31.

Additionally, since the plurality of claw portion pairs 63 each are erected in the axial direction from the body portion 61, compared to a case where the plurality of claw portion pairs 63 are inclined with respect to the axial direction, the internal radius of the first retainer 60 can be made as large as possible, and the external radius of the first retainer 60 can be made as small as possible. Accordingly, the first retainer 60 can be reliably kept from interfering with the first inner ring 36 and the first outer ring 31, and the bearing device 10 can be reduced in size even in the radial direction.

Second Rolling Bearing Portion

The second rolling bearing portion 40 includes a second inner ring 46 that is arranged coaxially with the central axis L1 of the shaft 20, a second outer ring 41 that surrounds the second inner ring 46 from the outer side of the shaft 20 in the radial direction, a plurality of rolling elements 35 that are rollably retained between the second inner ring 46 and the second outer ring 41, and a second retainer 70 that rollably, annularly, and equally arranges the plurality of rolling elements 35. In the present embodiment, the second inner ring 46 and the second outer ring 41 of the second rolling bearing portion 40 are respectively formed in a plane symmetrical shape with respect to the first inner ring 36 and the first outer ring 31 of the first rolling bearing portion 30. Additionally, the second retainer 70 is the same member as the first retainer 60 (refer to FIG. 3). Accordingly, the detailed description of the second rolling bearing portion 40 will be omitted.

Here, the first outer ring 31 of the first rolling bearing portion 30 and the second outer ring 41 of the second rolling bearing portion 40 are formed integrally with each other to form one outer ring 50. The outer ring 50 surrounds the first inner ring 36 of the first rolling bearing portion 30 and the second inner ring 46 of the second rolling bearing portion 40 from the outer side in the radial direction. Both of outer end portions 31a and 41a of the outer ring 50 in the axial direction are respectively arranged at nearly the same positions as the outer end portion 36a of the first inner ring 36 and the outer end portion 46a of the second inner ring 46 in the axial direction.

Additionally, the outer ring 50 is formed so as to have a uniform external diameter. As a result, even if the arm 8 (refer to FIG. 1) is externally fitted to the outer ring 50, relative deviation does not occur at the central axis of the first outer ring 31 and the second outer ring 41 unlike the related art.

The first rolling bearing portion 30 and the second rolling bearing portion 40 formed as described above are arranged side by side in the axial direction of the shaft 20 so that the inner end portion 36b of the first inner ring 36 and an inner end portion 46b of the second inner ring 46 do not interfere with each other. Incidentally, in the related art, a spacer and a tolerance ring are interposed between outer rings of pair of rolling bearings. Here, in the present embodiment, the first outer ring 31 of the first rolling bearing portion 30 and the second outer ring 41 of the second rolling bearing portion 40 are formed integrally with each other. Thus, the spacer and the tolerance ring are not interposed. Accordingly, compared to the related art, the first rolling bearing portion 30 and the second rolling bearing portion 40 can be arranged in proximity to each other in the axial direction.

Method of Manufacturing Bearing Device

Next, a method of manufacturing the bearing device 10 of the present embodiment will be described.

Figure 4:
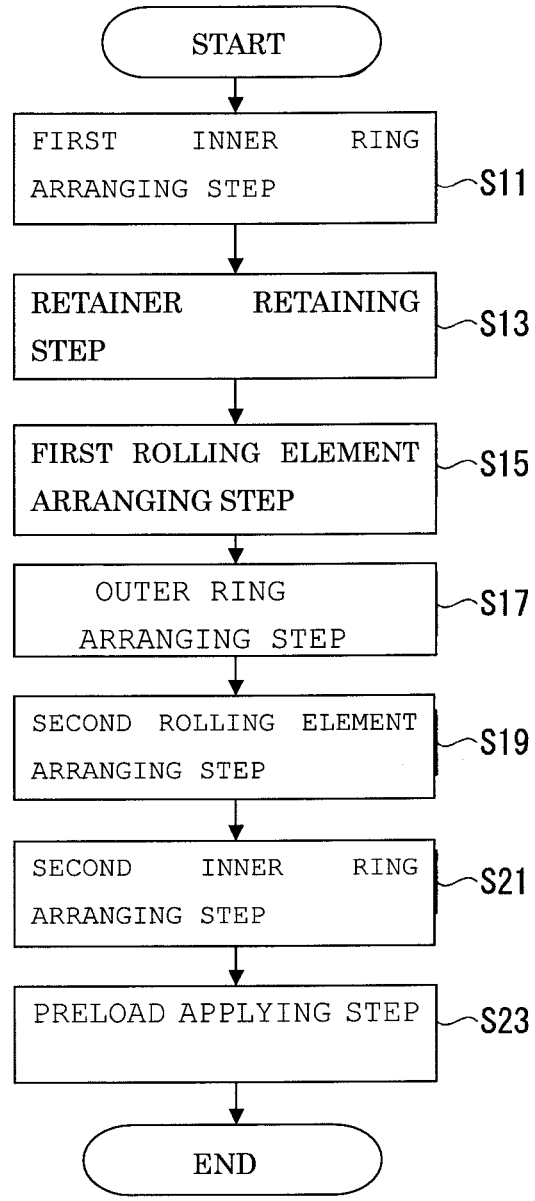
FIG. 4 is a flowchart of a process of manufacturing the bearing device.

FIG. 4 is a flowchart of a process (method) of manufacturing the bearing device 10.

As shown in FIG. 4, the process of manufacturing the bearing device 10 includes a first inner ring arranging step S11, a retainer retaining step S13, a first rolling element arranging step S15, an outer ring arranging step S17, a second rolling element arranging step S19, a second inner ring arranging step S21, and a preload applying step S23. The respective steps will be described below.

First Inner Ring Arranging Step S11

Figure 5:
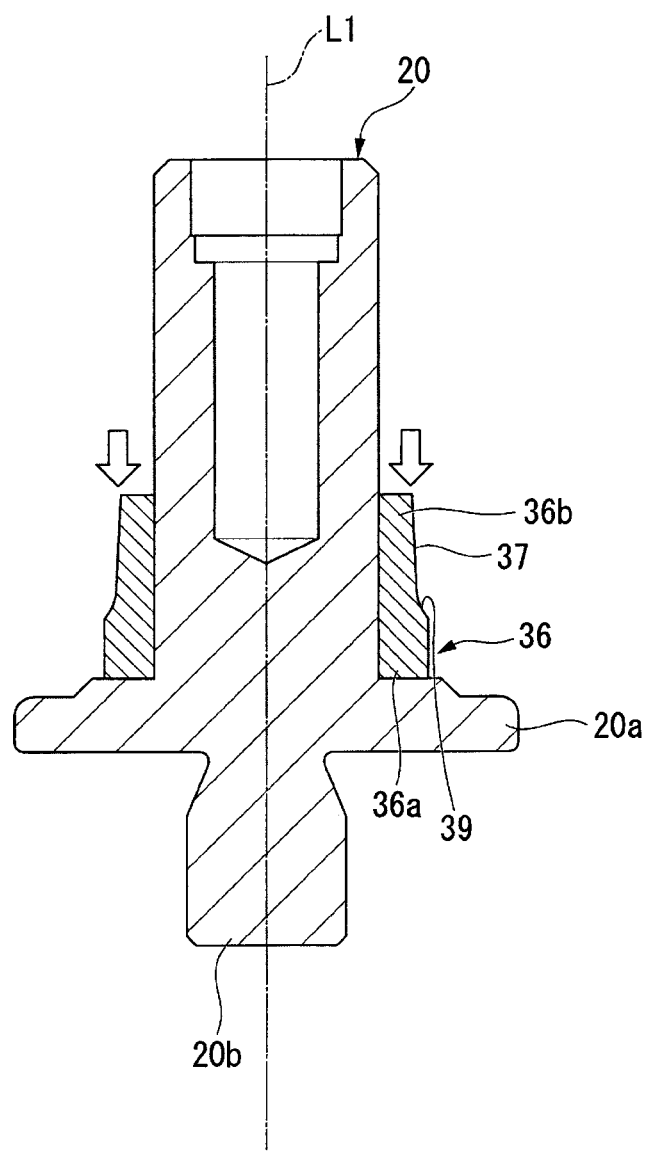
FIG. 5 is an explanatory view of a first inner ring arranging step.

FIG. 5 is an explanatory view of the first inner ring arranging step S11.

First, as shown in FIG. 5, the first inner ring arranging step S11 of inserting the first inner ring 36 of the first rolling bearing portion 30 out of the first inner ring 36 and the second inner ring 46 of the pair of rolling bearing portions 30 and 40 (refer to FIG. 2) into the shaft 20 to arrange the first inner ring on one side in the axial direction is performed.

In the first inner ring arranging step S11, the shaft 20 is arranged at a jig (not shown) in an erected state, and the outer peripheral surface of the shaft 20 is coated with an adhesive. Next, the first inner ring 36 is inserted into the shaft 20 in the axial direction from the other side in the axial direction in a state where the inner end portion 36b of the first inner ring 36 is arranged on the other side in the axial direction. Next, the first inner ring 36 is pushed in until the first inner ring 36 abuts against the flange portion 20a of the shaft 20. Thereafter, the adhesive is solidified and the first inner ring 36 is fixed to the shaft 20. That completes the first inner ring arranging step S11.

Retainer Retaining Step S13

Figure 6:
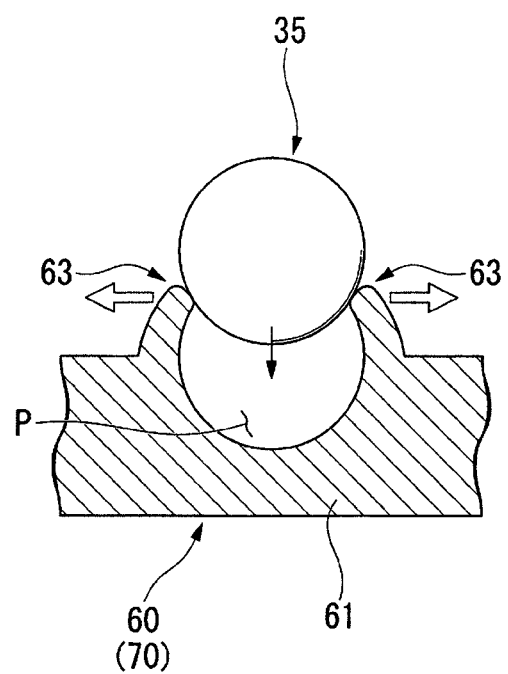
FIG. 6 is an explanatory view of a retainer retaining step.

FIG. 6 is an explanatory view of the retainer retaining step S13.

Subsequently, as shown in FIG. 6, the retainer retaining step S13 of making the first retainer 60 and the second retainer 70 rollably retain the plurality of rolling elements 35, respectively, and annularly and equally arrange the rolling elements is performed.

In the retainer retaining step S13, a rolling element 35 is pushed in between a pair of claw portions 63 of the first retainer 60, and the rolling element 35 is assembled into a ball pocket P of the body portion 61 of the first retainer 60. The pair of claw portions 63 are elastically deformed to the outer side by a pressing force when the rolling element 35 is pushed in. This enables the rolling element 35 to be inserted between the pair of claw portions 63 and assembled into the ball pocket P. Additionally, since the pair of claw portions 63 are elastically restored and deformed to their original state and the aperture becomes narrow if the rolling element 35 is inserted into the ball pocket P, the rolling element 35 can be rollably retained by the pair of claw portions 63 without falling off within the ball pocket P. Similarly, by assembling a plurality of (seven in the present embodiment) the rolling elements 35 into the first retainer 60, the plurality of rolling elements 35 are rollably retained by the first retainer 60 in a state where the rolling elements are equally arranged in the circumferential direction. Moreover, similarly, when the plurality of (seven in the present embodiment) rolling elements 35 are assembled into the second retainer 70, the retainer retaining step S13 is completed.

In addition, the retainer retaining step S13 may be performed before the first inner ring arranging step S11. Additionally, in the present embodiment, the assembling of the rolling elements 35 into the first retainer 60 and the second retainer 70 is performed in one step (retainer retaining step S13), but may be performed in separate steps. Specifically, the retainer retaining step may be divided into a first retainer retaining step of assembling the rolling elements 35 into the first retainer 60, and a second retainer retaining step of assembling the rolling elements 35 into the second retainer 70, and the respective retainer retaining steps may be performed at different timings.

First Rolling Element Arranging Step S15

Figure 7:
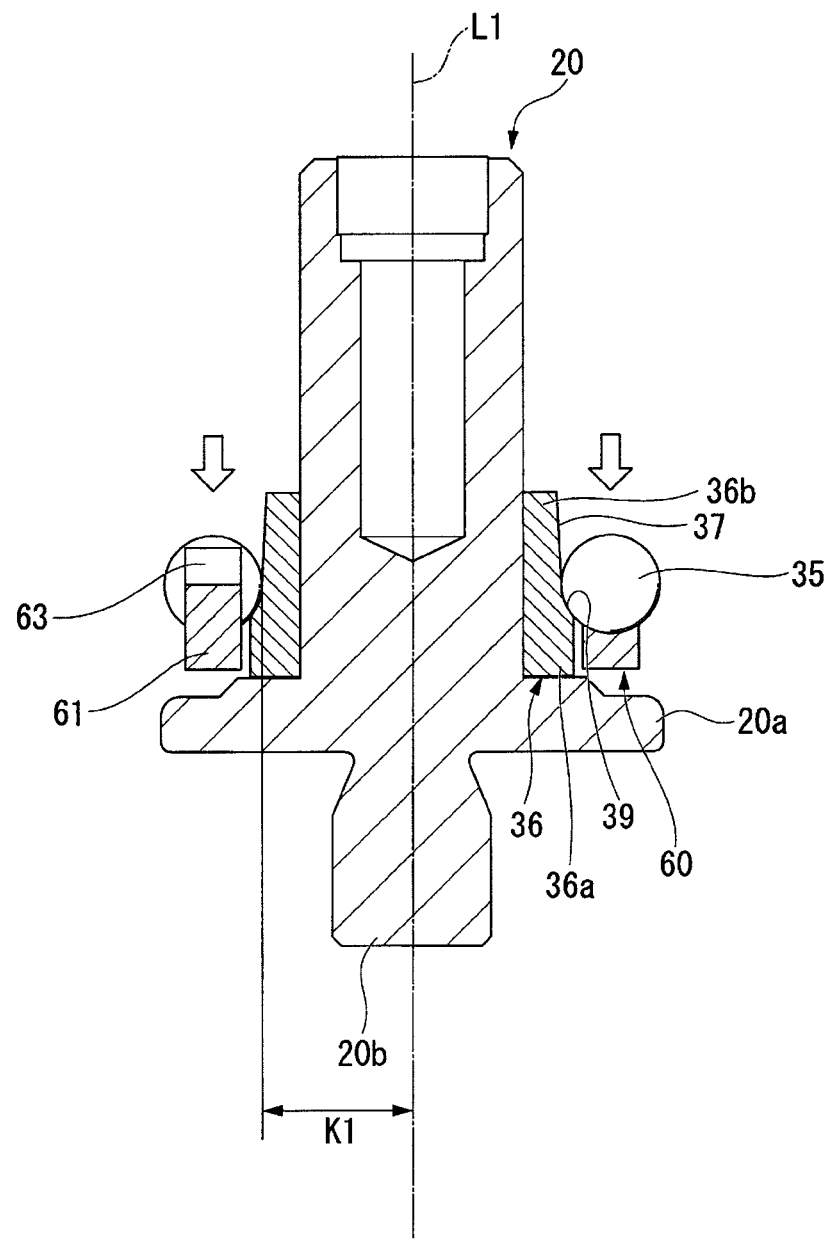
FIG. 7 is an explanatory view of a first rolling element arranging step.

FIG. 7 is an explanatory view of the first rolling element arranging step S15.

Subsequently, as shown in FIG. 7, the first rolling element arranging step S15 of inserting the plurality of rolling elements 35 into the first inner ring 36 together with the first retainer 60 from the other side in the axial direction and placing the plurality of rolling elements 35 on the inner ring rolling surface 39 of the first inner ring 36 is performed.

The inner end portion 36b of the first inner ring 36 is formed so that the external radius thereof is smaller than the first separation distance K1. Accordingly, in the first rolling element arranging step S15, the plurality of rolling elements 35 can be easily inserted together with the first retainer 60 from the other side in the axial direction without interfering with the inner end portion 36b of the first inner ring 36. Additionally, the inner ring rolling surface 39 of the first inner ring 36 is formed so as to have an external radius that becomes gradually larger than the first separation distance K1 from the inner side toward the outer side in the axial direction (that is, from the other side toward one side in the axial direction). Accordingly, in the first rolling element arranging step S15, the plurality of rolling elements 35 can be easily placed on the inner ring rolling surface 39 by inserting the plurality of rolling elements 35 into the first inner ring 36 together with the first retainer 60 from the other side in the axial direction. Moreover, since the plurality of rolling elements 35 are equally arranged and retained by the first retainer 60 so as to be immovable relative to each other, the plurality of rolling elements 35 can be retained in a state where the rolling elements are placed on the inner ring rolling surface 39, without using a jig or the like. In this way, according to the first rolling element arranging step S15 of the present embodiment, the plurality of rolling elements 35 can be easily arranged on the outer side of the first inner ring 36 in the radial direction. That completes the first rolling element arranging step S15.

Outer Ring Arranging Step S17

Figure 8:
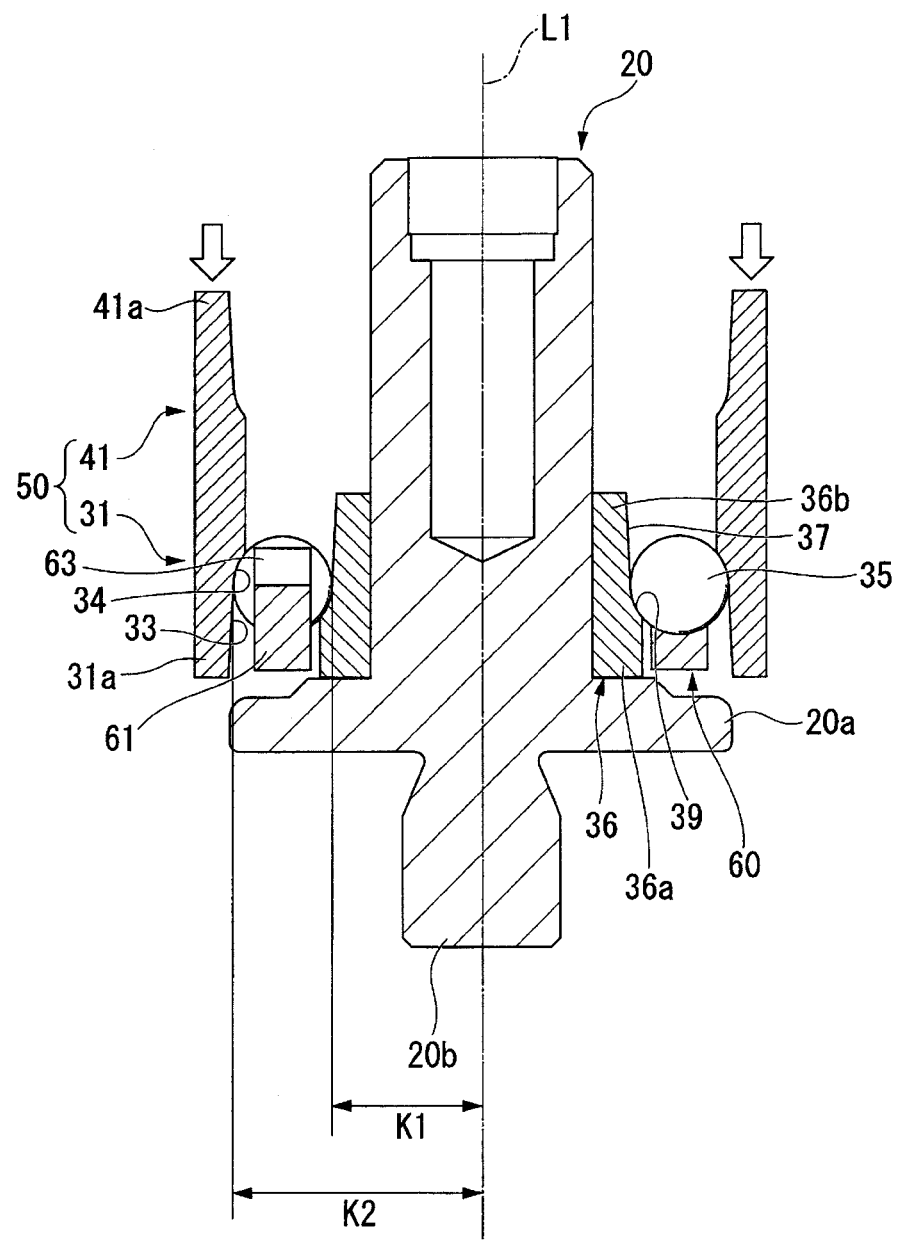
FIG. 8 is an explanatory view of an outer ring arranging step.

FIG. 8 is an explanatory view of the outer ring arranging step S17.

Subsequently, as shown in FIG. 8, the outer ring arranging step S17 of inserting the outer ring 50 into the first inner ring 36 from the other side in the axial direction is performed.

The outer end portion 31a of the outer ring 50 is formed so that the external radius thereof is larger than the second separation distance K2. Accordingly, in the outer ring arranging step S17, the outer ring 50 can be easily inserted into the first inner ring 36 from the other side in the axial direction without interfering with the plurality of rolling elements 35. Additionally, the outer ring rolling surface 34 of the first rolling bearing portion 30 (refer to FIG. 1) arranged on one side of the outer ring 50 is formed so as to have an internal radius that becomes gradually smaller than the second separation distance K2 from the outer side toward the inner side in the axial direction (that is, from one side toward the other side in the axial direction). Accordingly, in the outer ring arranging step S17, when the outer ring 50 is inserted into the first inner ring 36 from the other side in the axial direction, the outer ring rolling surface 34 can be made to abut against the plurality of rolling elements 35. Since this allows the outer ring 50 to be positioned at a predetermined position in the axial direction, the outer ring 50 can be retained in a state where the outer ring rolling surface 34 abuts against the plurality of rolling elements 35, without using a jig or the like. In this way, according to the outer ring arranging step S17 of the present embodiment, the outer ring 50 can be easily arranged on the outer side of the first inner ring 36 in the radial direction. That completes the outer ring arranging step S17.

Second Rolling Element Arranging Step S19

Figure 9:
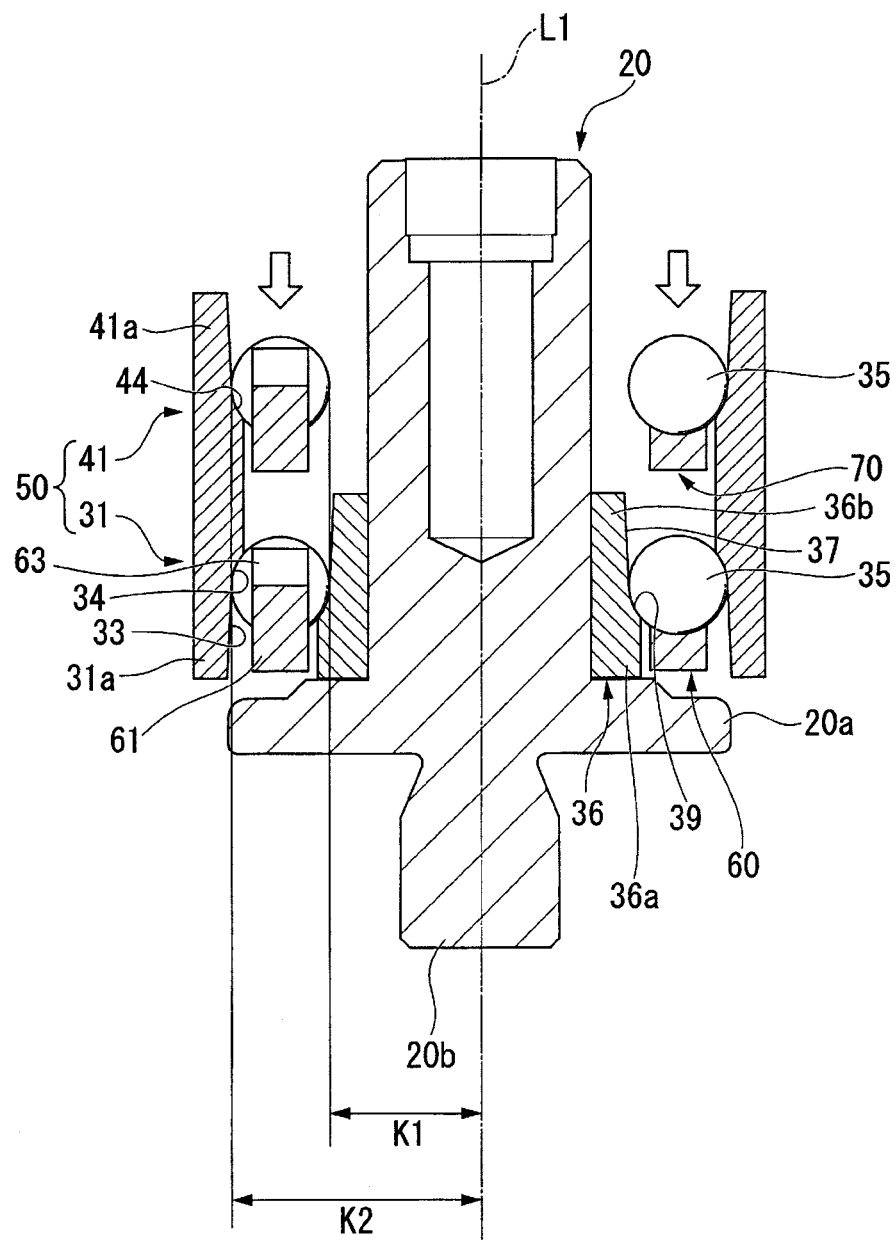
FIG. 9 is an explanatory view of a second rolling element arranging step.

FIG. 9 is an explanatory view of the second rolling element arranging step S19. Subsequently, as shown in FIG. 9, the second rolling element arranging step S19 of inserting a plurality of rolling elements 35 into the outer ring 50 together with the second retainer 70 from the other side in the axial direction and placing the plurality of rolling elements 35 on the outer ring rolling surface 44 on the other side in the axial direction is performed.

The outer end portion 41a of the outer ring 50 arranged on the other side in the axial direction is formed so as to have an internal radius that is larger than the second separation distance K2. Accordingly, in the second rolling element arranging step S19, the plurality of rolling elements 35 can be easily inserted together with the second retainer 70 from the other side in the axial direction without interfering with the outer ring 50. Additionally, the outer ring rolling surface 44 of the second rolling bearing portion 40 (refer to FIG. 1) arranged on the other side of the outer ring 50 in the axial direction is formed so as to have an internal radius that becomes gradually smaller than the second separation distance K2 from the outer side toward the inner side in the axial direction (that is, from the other side toward one side in the axial direction). Accordingly, in the second rolling element arranging step S19, the plurality of rolling elements 35 can be simply placed on the outer ring rolling surface 44 by inserting the plurality of rolling elements 35 into the outer ring 50 together with the second retainer 70 from the other side in the axial direction. Moreover, since the plurality of rolling elements 35 are equally arranged and retained by the second retainer 70 so as to be immovable relative to each other, the plurality of rolling elements 35 can be retained in a state where the rolling elements are placed on the outer ring rolling surface 44, without using a jig or the like. In this way, according to the second rolling element arranging step S19 of the present embodiment, the plurality of rolling elements 35 can be easily arranged on the inner side of the outer ring 50 in the radial direction. That completes the second rolling element arranging step S19.

Second Inner Ring Arranging Step S21

Figure 10:
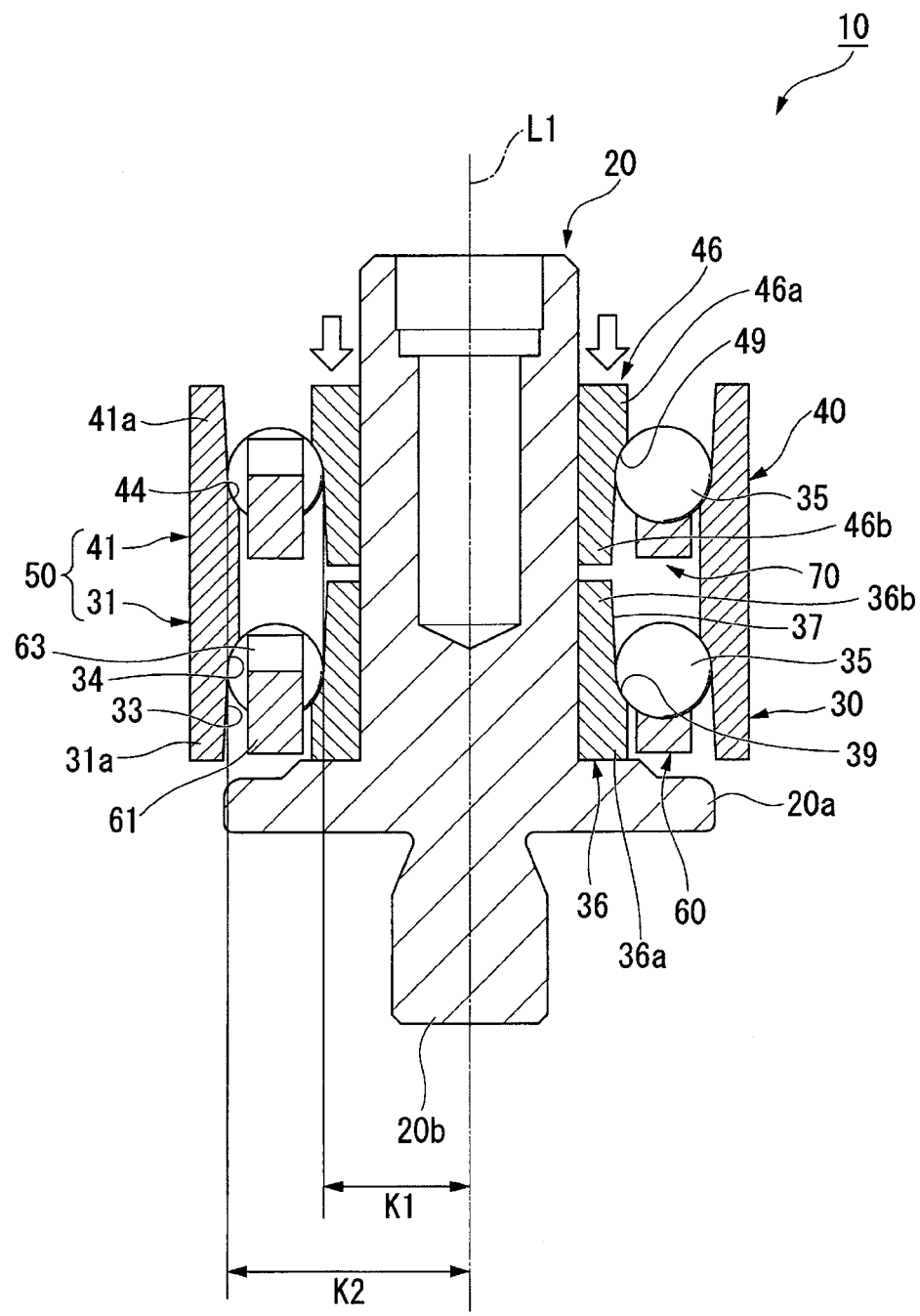
FIG. 10 is an explanatory view of a second inner ring arranging step and a preload applying step.

FIG. 10 is an explanatory view of the second inner ring arranging step S21 and the preload applying step S23. Subsequently, as shown in FIG. 10, the second inner ring arranging step S21 of inserting the second inner ring 46 of the second rolling bearing portion 40 out of the first inner ring 36 and the second inner ring 46 of the pair of rolling bearing portions 30 and 40 into the shaft 20 to arrange the second inner ring on the other side in the axial direction is performed.

In the second inner ring arranging step S21, the second inner ring 46 is inserted in the axial direction from the other side of the shaft 20 in a state where the inner end portion 46b of the second inner ring 46 is arranged on one side. At this time, the inner end portion 46b of the second inner ring 46 arranged on one side in the axial direction is formed so that the external radius thereof is smaller than the first separation distance K1. Accordingly, in the second inner ring arranging step S21, the inner end portion 46b of the second inner ring 46 can be easily inserted from the other side in the axial direction without interfering with the plurality of rolling elements 35. Additionally, the inner ring rolling surface 49 of the second inner ring 46 is formed so as to have an external radius that becomes gradually larger than the first separation distance K1 from the inner side toward the outer side in the axial direction (that is, from one side toward the other side in the axial direction). Accordingly, in the second inner ring arranging step S21, the second inner ring 46 is inserted into the shaft 20 from the other side in the axial direction, the inner ring rolling surface 49 of the second inner ring 46 can be made to abut against the plurality of rolling elements 35. Since this allows the second inner ring 46 to be positioned at a predetermined position in the axial direction, the second inner ring 46 can be retained in a state where the inner ring rolling surface 49 abuts against the plurality of rolling elements 35, without using a jig or the like. In this way, according to the second inner ring arranging step S21 of the present embodiment, the second inner ring 46 can be easily arranged on the outer side of the shaft 20 in the radial direction. This completes the second inner ring arranging step S21.

Preload Applying Step S23

Subsequently, the preload applying step S23 of fixing the first inner ring 36 and the second inner ring 46 to the shaft 20 while relatively pressing the first inner ring and the second inner ring in the axial direction is performed. In the present embodiment, the first inner ring 36 and the second inner ring 46 are relatively pressed by pressing the second inner ring 46 from the other side toward one side (that is, toward the first inner ring 36 side) in a state where the first inner ring 36 is fixed. In addition, the pressing of the second inner ring 46 is performed using a jig (not shown).

By pressing the second inner ring 46 of the second rolling bearing portion 40, the separation distance between the first inner ring 36 of the first rolling bearing portion 30 and the second inner ring 46 of the second rolling bearing portion 40 becomes short. Here, the first outer ring 31 of the first rolling bearing portion 30 and the second outer ring 41 of the second rolling bearing portion 40 are integrally formed to form the common outer ring 50 of the first rolling bearing portion 30 and the second rolling bearing portion 40. Accordingly, by pressing the second inner ring 46 toward one side, the rolling elements 35 of the second rolling bearing portion 40 press the outer ring rolling surface 44 of the second outer ring 41, and the outer ring 50 is pressed toward one side. Additionally, as the outer ring 50 is pressed toward one side, the rolling elements 35 of the first rolling bearing portion 30 are pressed against the outer ring rolling surface 34 of the outer ring 50 to press the inner ring rolling surface 39 of the first inner ring 36.

By pressing the second inner ring 46 of the second rolling bearing portion 40 in the axial direction from the other side toward one side in this way, a preload is applied to the first inner ring 36 of the first rolling bearing portion 30 and the second inner ring 46 of the second rolling bearing portion 40. Then, the second inner ring 46 of the second rolling bearing portion 40 is pressed until the adhesive hardens.

When the adhesive hardens, the preload applying step S23 is completed and the bearing device 10 related to the present embodiment is completed.

In addition, in the first inner ring arranging step S11 and the second inner ring arranging step S21 of the present embodiment, the first inner ring 36 and the second inner ring 46 are fixed to the shaft 20 with adhesives, respectively. In contrast, for example, through press-fitting, laser welding, or the like, the first inner ring 36 and the second inner ring 46 may be fixed to the shaft 20. This enables the first inner ring 36 and the second inner ring 46 to be fixed to the shaft 20 without using an adhesive. Accordingly, generation of outgas from the adhesive can be prevented and defects of the information recording/reproducing apparatus 1 resulting from outgas can be prevented.

Effects of First Embodiment

According to the first embodiment, since the first outer ring 31 of the first rolling bearing portion 30 and the second outer ring 41 of the second rolling bearing portion 40 are formed integrally with each other to form one outer ring 50, relative deviation does not occur at the central axis of the first outer ring 31 and the second outer ring 41 when the arm 8 is externally fitted to the outer ring 50. Accordingly, the bearing device 10 that can suppress a torque ripple and a torque increase when the arm 8 rotates can be provided.

Additionally, by forming the first outer ring 31 of the first rolling bearing portion 30 and the second outer ring 41 of the second rolling bearing portion 40 are formed integrally with each other to form one outer ring 50, it is unnecessary to provide the spacer, the tolerance ring, the sleeve, or the like unlike the related art. Accordingly, since the number of parts of the bearing device 10 can be reduced, reduction in size, weight, and cost of the bearing device 10 can be realized. Particularly, since the spacer is unnecessary, the first rolling bearing portion 30 and the second rolling bearing portion 40 can be arranged in proximity to each other in the axial direction. This enables reduction in thickness of the bearing device 10 in the axial direction to be realized, and enables reduction in material cost to be realized.

Additionally, the number of steps of cutting work can be reduced by forming the first inner ring 36, the second inner ring 46, and the outer ring 50 by forging. Accordingly, reduction in overall cost of the bearing device 10 can be realized.

Incidentally, in the related art, in order to arrange the rolling elements between the inner ring and the outer ring, the plurality of rolling elements are individually inserted between the inner ring and the outer ring while relatively shifting the central axes of the inner ring and the outer ring in the radial direction and providing a larger gap than the external diameter of the rolling elements between the inner ring and the outer ring, and then, the rolling elements are equally arranged in the circumferential direction using the retainers.

However, according to the present embodiment, after the plurality of rolling elements 35 are annularly and equally arranged in advance in the retainer retaining step S13, the plurality of rolling elements 35 can be placed on the inner ring rolling surface 39 of the first inner ring 36 and the outer ring rolling surface 44 of the second outer ring 41 together with the first retainer 60 and the second retainer 70, in the first rolling element arranging step S15 and the second rolling element arranging step S19. Since this enables the plurality of rolling elements 35 to be arranged at one time, the related-art complicated operation of inserting the rolling elements between the inner ring and the outer ring while shifting the inner ring and the outer ring from each other is not required, and the first rolling bearing portion 30 and the second rolling bearing portion 40 can be simply formed.

Moreover, since the first inner ring 36 of the first rolling bearing portion 30 includes the inner ring rolling surface 39 formed so as to have an external radius that becomes gradually larger than the first separation distance K1 from the inner side toward the outer side in the axial direction, the plurality of rolling elements 35 can be simply placed on the inner ring rolling surface 39 without using a jig or the like when being inserted into the first inner ring 36 from the other side (inner side in the axial direction) in the axial direction in the first rolling element arranging step S15. Additionally, since the outer ring 50 of the first rolling bearing portion 30 and the second rolling bearing portion 40 formed integrally includes the outer ring rolling surface 44 formed so that the internal radius thereof becomes gradually smaller than the second separation distance K2 from the outer side toward the inner side in the axial direction, the plurality of rolling elements 35 can be simply placed on the outer ring rolling surface 44 without using a jig or the like when being inserted into the outer ring 50 from the other side (outer side in the axial direction) in the axial direction, in the second rolling element arranging step S19.

In this way, according to the method of manufacturing the bearing device 10 of the first embodiment, the bearing device 10 can be simply manufactured. Thus, manufacturing cost can be reduced and reduction in overall cost of the bearing device 10 can be realized.

Additionally, since the rolling elements 35 can be placed on the inner ring rolling surface 39 of the first inner ring 36 by being inserted from the inner end portion in the axial direction, and the rolling elements 35 can be placed on the outer ring rolling surface 44 of the second outer ring 41 by being inserted from the outer end portion in the axial direction, the rolling elements 35 can be arranged without being limited in number and/or size thereof due to a gap between the inner ring and the outer ring unlike the related art. Accordingly, the rigidity of the bearing device 10 can be increased.

Additionally, according to the information recording/reproducing apparatus 1 of the first embodiment, since the bearing device 10 that can suppress a torque ripple and a torque increase when the arm 8 rotates and can realize reduction in size, weight, and cost is included, high efficiency of the information recording/reproducing apparatus 1 and reduction in thickness, weight, and cost thereof can be realized.

Additionally, since the first outer ring 31 and the second outer ring 41 of the bearing device 10 are formed integrally with each other to form one outer ring 50, weight reduction and high rigidity of the outer ring 50 can be realized. Since this can make the resonant frequency (resonant point) of the bearing device 10 high, the arm 8 can be rotated at high speed.

Accordingly, high performance of the information recording/reproducing apparatus 1 can be realized.

First Modification Example of First Embodiment

Figure 11:
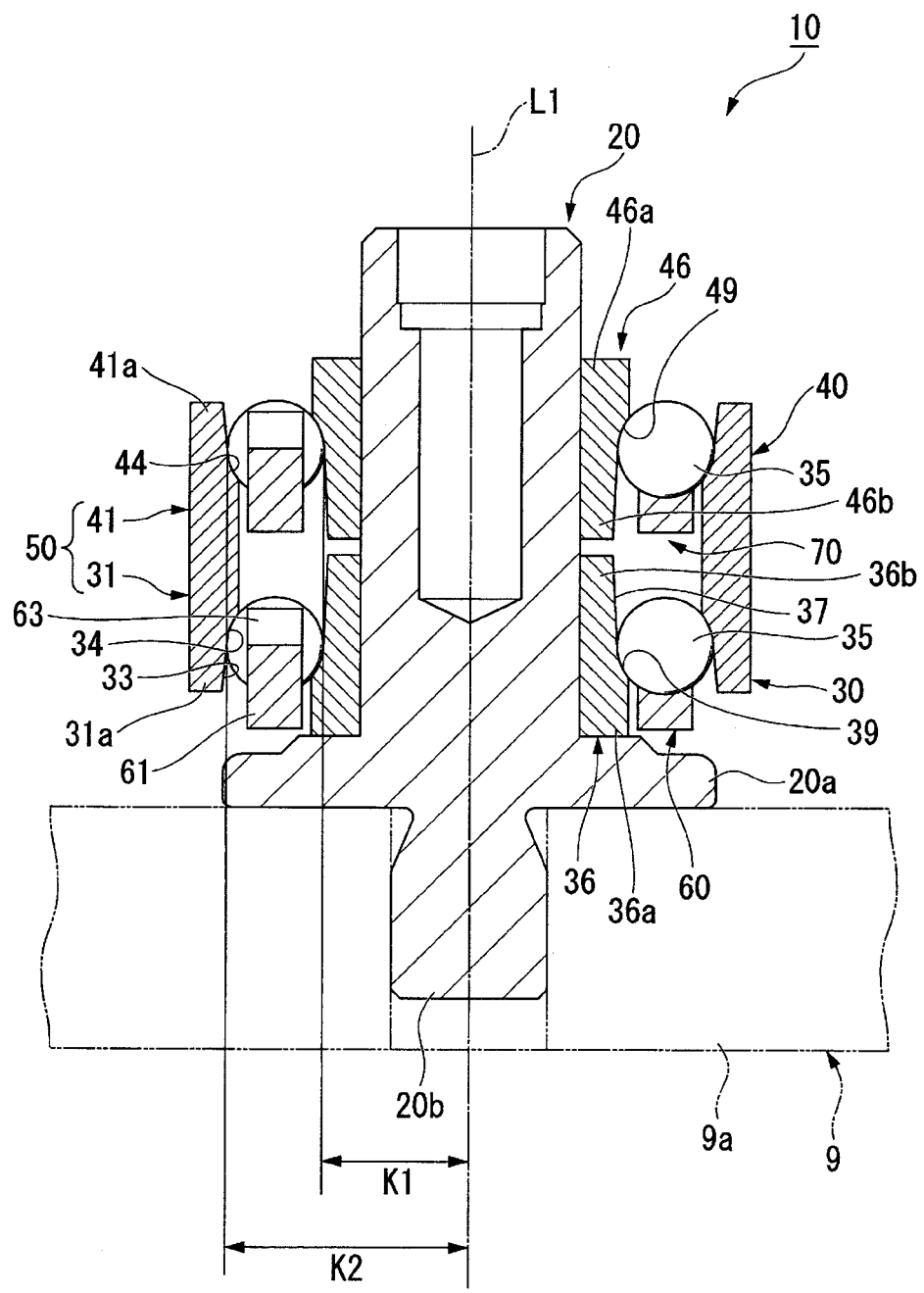
FIG. 11 is a side cross-sectional view of the bearing device related to a first modification example of the first embodiment.

FIG. 11 is an explanatory view of the bearing device 10 related to a first modification example of the first embodiment.

Subsequently, the bearing device 10 related to the first modification example of the first embodiment will be described. In addition, the description of the same components as those of the first embodiment will be omitted, and only portions that are different will be described.

In the bearing device 10 of the first embodiment, both of the outer end portions 31a and 41a of the outer ring 50 in the axial direction are arranged at nearly the same positions as the outer end portion 36a of the first inner ring 36 and the outer end portion 46a of the second inner ring 46 in the axial direction (refer to FIG. 2).

In contrast, as shown in FIG. 11, in the bearing device 10 of the first modification example of the first embodiment, both of the outer end portions 31a and 41a of the outer ring 50 in the axial direction are respectively arranged further toward the inner side in the axial direction than the outer end portion 36a of the first inner ring 36 and the outer end portion 46a of the second inner ring 46 and further toward the outer side than abutting portions with the outer ring rolling surfaces 34 and 44 and the rolling elements 35.

According to the first modification example of the first embodiment, since both of the outer end portions 31a and 41a of the outer ring 50 in the axial direction are respectively arranged further toward the inner side in the axial direction than the outer end portion 36a of the first inner ring 36 and the outer end portion 46a of the second inner ring 46, the axial length of the outer ring 50 can be made shorter than that of the first embodiment. This enables further reduction in weight and cost of the bearing device 10 to be realized.

Second Modification Example of First Embodiment

Figure 12:
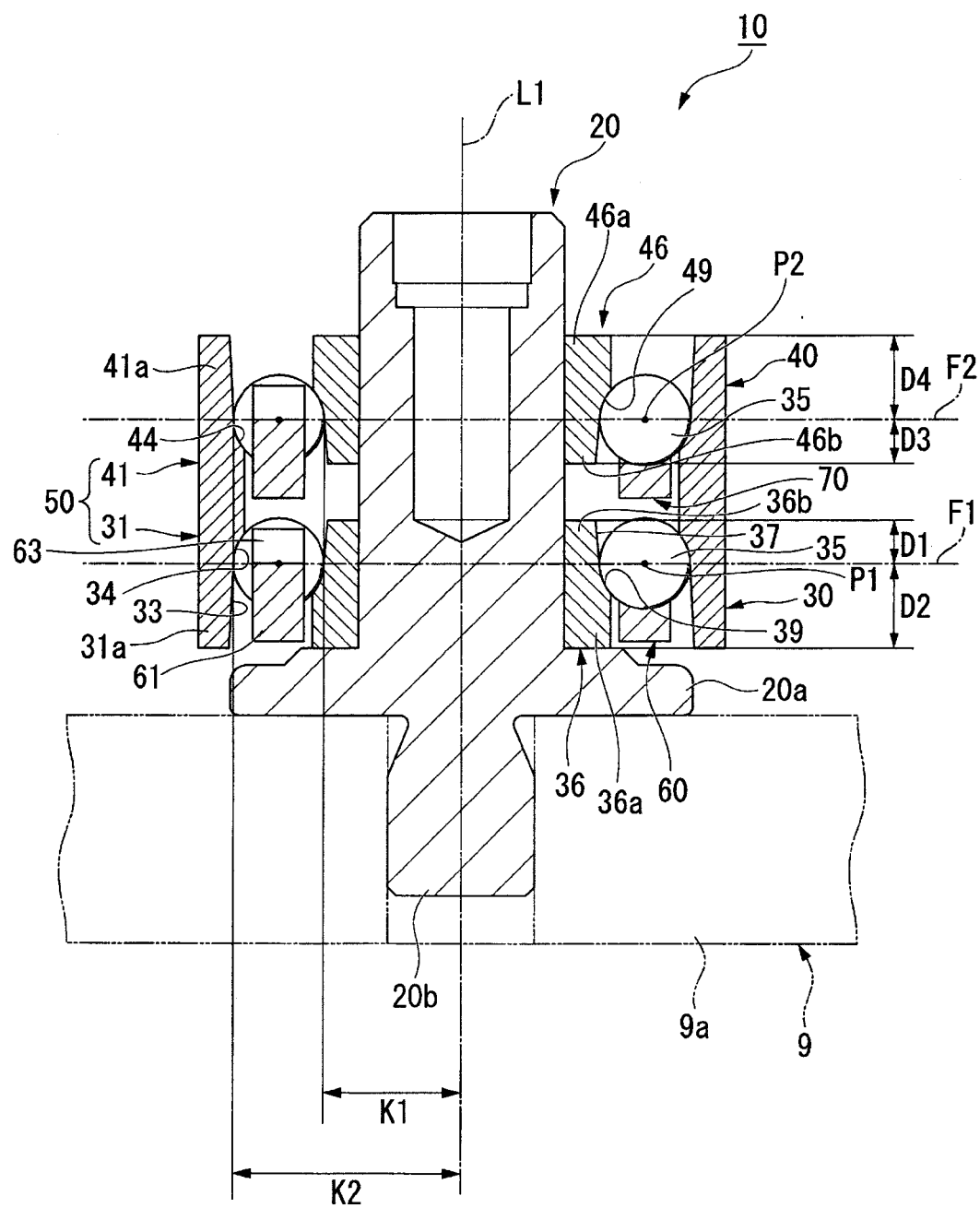
FIG. 12 is a side cross-sectional view of the bearing device related to a second modification example of the first embodiment.

FIG. 12 is an explanatory view of the bearing device 10 related to a second modification example of the first embodiment.

Subsequently, the bearing device 10 related to the second modification example of the first embodiment will be described. In addition, the description of the same components as those of the first embodiment will be omitted, and only portions that are different will be described. Additionally, hereinafter, description will be made with an imaginary plane including a center P1 of the plurality of rolling elements 35 of the first rolling bearing portion 30 being defined as an imaginary plane F1, and an imaginary plane including a center P2 of the plurality of rolling elements 35 of the second rolling bearing portion 40 being defined as an imaginary plane F2.

As shown in FIG. 12, in the bearing device 10 of the second modification example of the first embodiment, the inner end portion 36b of the first inner ring 36 and the inner end portion 46b of the second inner ring 46 are arranged further toward the outer side than those of the first embodiment.

The bearing device 10 of the second modification example of the first embodiment, for example, is arranged so that a distance D1 from the imaginary plane F1 to the inner end portion 36b of the first inner ring 36 in the axial direction becomes shorter than a distance D2 from the imaginary plane F1 to the outer end portion 36a of the first inner ring 36 in the axial direction. Similarly, the bearing device 10 is arranged so that a distance D3 from the imaginary plane F2 to the inner end portion 46b of the second inner ring 46 in the axial direction becomes shorter than a distance D4 from the imaginary plane F2 to the outer end portion 46a of the second inner ring 46 in the axial direction.

According to the second modification example of the first embodiment, the axial lengths of the first inner ring 36 and the second inner ring 46 can be shortened without reducing the rigidity of the bearing device 10. This enables further reduction in thickness, size, and cost of the bearing device 10 to be realized. Additionally, since the length of the inner end portion 36b of the first inner ring 36 in the axial direction and the length of the inner end portion 46b of the second inner ring 46 in the axial direction, which limit thickness in size of the bearing device 10, can be shortened, reduction in thickness of the bearing device 10 can be realized compared to the first embodiment.

Second Embodiment

Figure 13:
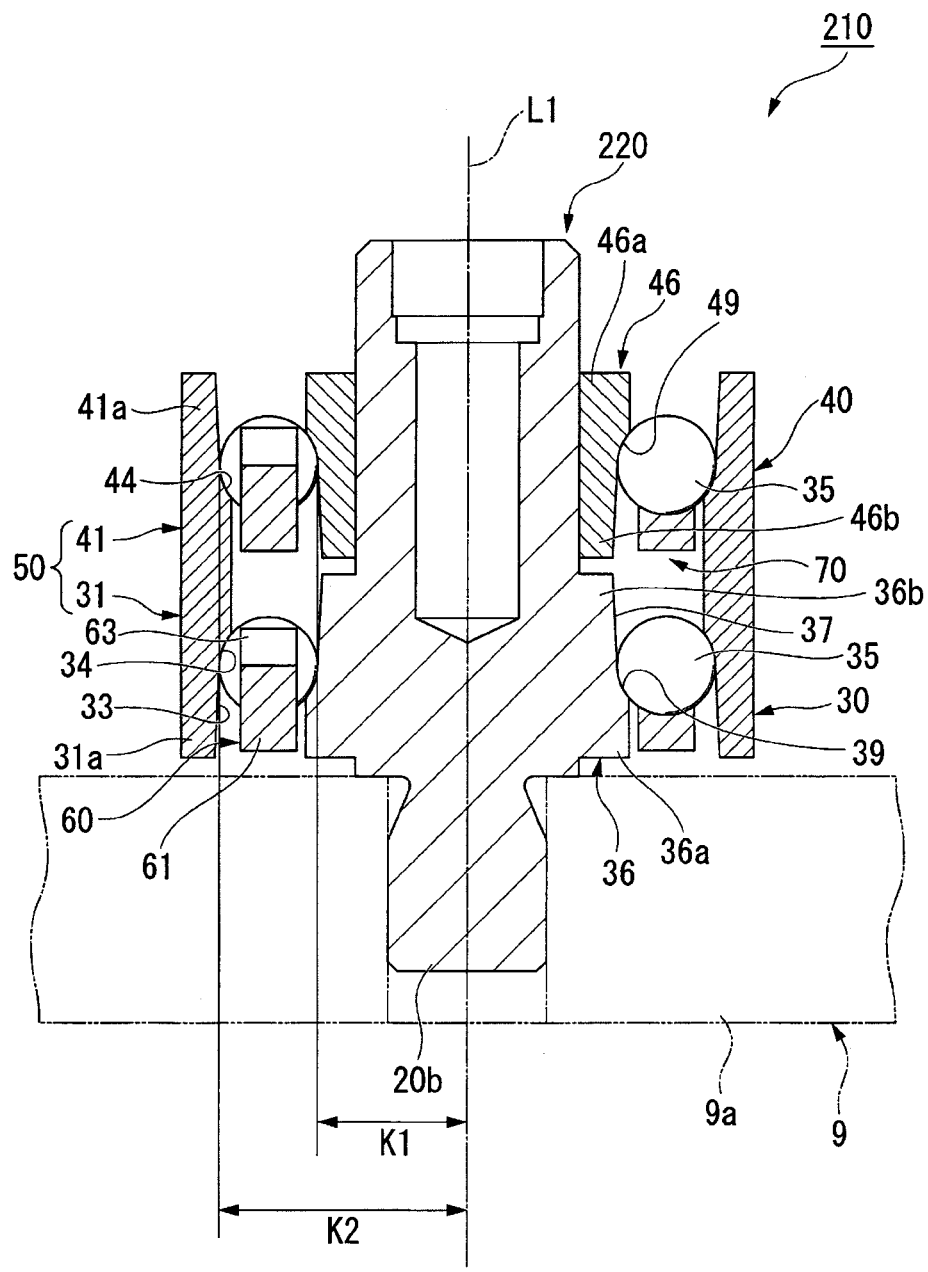
FIG. 13 is a side cross-sectional view of a bearing device of a second embodiment.

FIG. 13 is an explanatory view of a bearing device 210 of a second embodiment.

Subsequently, the bearing device 210 of the second embodiment will be described. In addition, the description of the same components as those of the first embodiment will be omitted, and only portions that are different will be described.

In the bearing device 10 of the first embodiment, the shaft 20, the first inner ring 36, and the second inner ring 46 are formed as separate parts (refer to FIG. 2).

In contrast, as shown in FIG. 13, in the bearing device 210 of the second embodiment, a shaft 220 and the first inner ring 36 are integrally formed. In the first embodiment, the first inner ring 36 is inserted into the shaft 20 and the outer end portion 36a of the first inner ring 36 is made to abut against the flange portion 20a of the shaft 20, whereby the first inner ring 36 is fixed to one side of the shaft 20 in the axial direction while being positioned in the axial direction (refer to FIG. 2). In contrast, in the second embodiment, since the shaft 220 and the first inner ring 36 are integrally formed and the first inner ring 36 does not need to be positioned in the axial direction, it is not necessary to provide the flange portion on one side of the shaft 220 in the axial direction.

Effects of Second Embodiment

According to the second embodiment, since the number of parts of the bearing device 210 can be further reduced, further reduction in size, weight, and cost of the bearing device 210 can be realized. Additionally, since it is not necessary to insert the first inner ring 36 of the first rolling bearing portion 30 into the shaft 220, the number of assembling steps of the bearing device 210 can be reduced, and manufacturing cost can be reduced. Accordingly, further reduction in overall cost of the bearing device 210 can be realized.

In addition, although a case where the shaft 220 and the first inner ring 36 of the first rolling bearing portion 30 are integrally formed has been described as an example in the second embodiment, the shaft 220 and the second inner ring 46 of the second rolling bearing portion 40 may be integrally formed. That is, if either the first inner ring 36 of the first rolling bearing portion 30 or the second inner ring 46 of the second rolling bearing portion 40 is formed integrally with the shaft 220, the above functional effects can be obtained.

Third Embodiment

Figure 14:
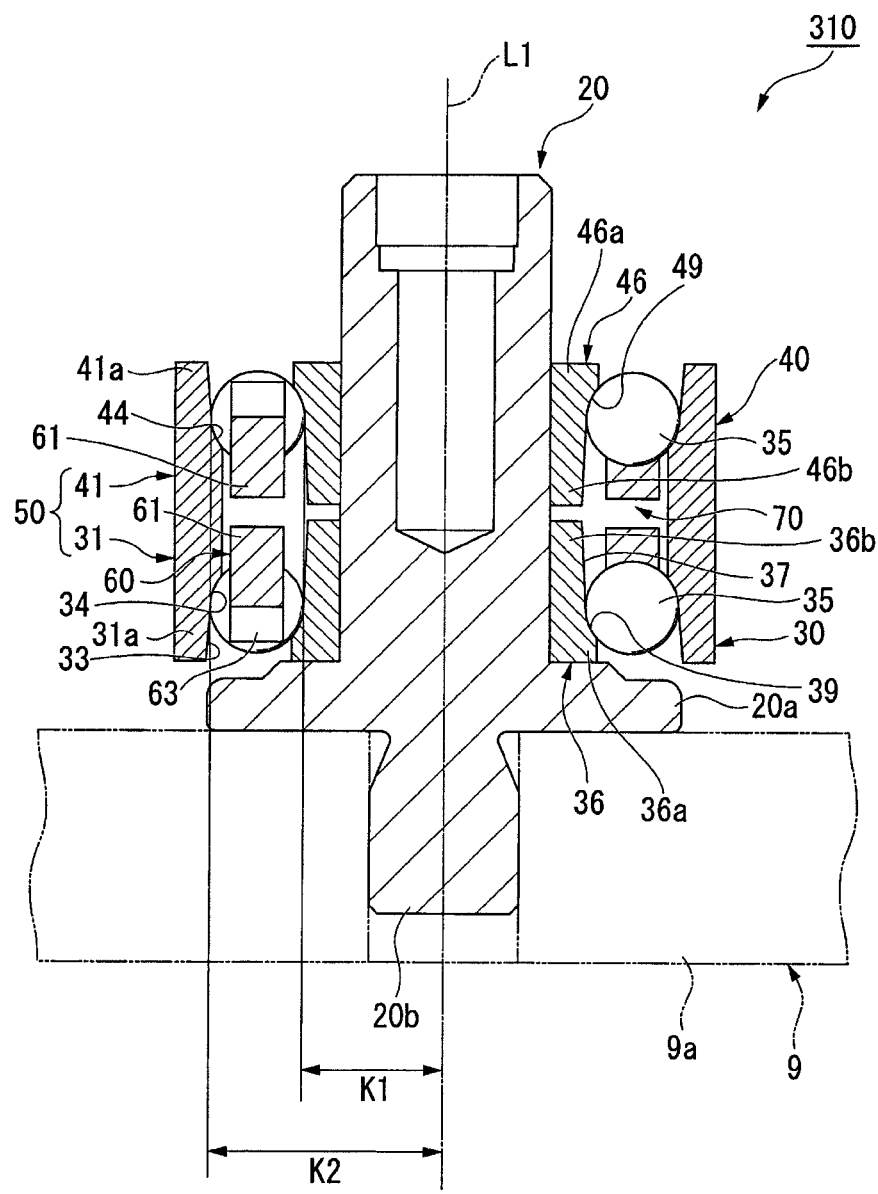
FIG. 14 is a side cross-sectional view of a bearing device of a third embodiment.

FIG. 14 is an explanatory view of a bearing device 310 related to a third embodiment.

Subsequently, the bearing device 310 related to the third embodiment will be described. In addition, the description of the same components as those of the first embodiment will be omitted, and only portions that are different will be described.

In the bearing device 10 of the first embodiment, the body portion 61 of the first retainer 60 is arranged on the outer side in the axial direction, and the body portion 61 of the second retainer 70 is arranged on the inner side in the axial direction (refer to FIG. 2).

In contrast, as in the bearing device 310 related to the third embodiment shown in FIG. 14, the body portion 61 of the first retainer 60 and the body portion 61 of the second retainer 70 may be arranged on the inner side in the axial direction, respectively.

The body portion 61 of the first retainer 60 and the body portion 61 of the second retainer 70 have thicknesses in the axial direction in order to retain the rolling elements 35. Accordingly, reduction in thickness (shortening in the axial direction) of the bearing device 310 is limited by the body portion 61 of the first retainer 60 and the body portion 61 of the second retainer 70. Here, in the bearing device 10 of the first embodiment shown in FIG. 2, a region closer to the inner side in the axial direction than the claw portions 63 of the first retainer 60 becomes a dead space. Accordingly, by arranging the body portion 61 of the first retainer 60 on the inner side in the axial direction as shown in FIG. 14, reduction in thickness (shortening in the axial direction) of the bearing device 310 can be prevented from being limited by the body portion 61 of the first retainer 60. This enables the bearing device 310 to be reduced in thickness as much as possible.

In addition, the technical scope of the invention is not limited to the above embodiments, and various changes can be made without departing from the scope of the invention.

The shapes of the shafts 20 and 220 are not limited to the first embodiment and the second embodiment. For example, although the shaft 20 of the first embodiment has the flange portion 20a formed on one side in the axial direction, the flange portion 20a may not be formed.

Additionally, the shapes of the first retainer 60 and the second retainer 70 and the numbers of rolling elements 35 to be arranged are not limited to the first embodiment.

In the first embodiment, the bearing device 10 is applied as a rotating shaft of the arm 8 of the information recording/reproducing apparatus 1. However, the application of the bearing device 10 is not limited to the rotating shaft of the arm 8 of the information recording/reproducing apparatus 1. For example, the bearing device 10 may be applied as a rotating shaft of the spindle motor 7 that rotates the disk D of the information recording/reproducing apparatus 1, or the bearing device 10 may be applied as a rotating shaft of a polygon mirror for scanning a laser light source.

Additionally, the respective embodiments and the respective modification examples of the first embodiment may be appropriately combined. For example, the first modification example of the first embodiment, and the second embodiment may be combined to arrange both of the outer end portions 31a and 41a of the outer ring 50 in the axial direction further toward the inner side in the axial direction than the outer end portion 36a of the first inner ring 36 and the outer end portion 46a of the second inner ring 46, respectively, and integrally form the first inner ring 36 and the shaft 220.

Additionally, in the respective embodiments and the respective modification examples of the first embodiment, the first retainer 60 and the second retainer 70 are included. However, the plurality of rolling elements 35 may be arranged between the inner ring rolling surface 39 or 49 and the outer ring rolling surface 34 or 44 without using the first retainer 60 and the second retainer 70. Additionally, at this time, in the process of manufacturing the bearing device 10, the retainer retaining step S13 becomes unnecessary, and the first rolling element arranging step S15 and the second rolling element arranging step S19 can be performed by retaining the rolling elements 35 with a jig or the like.

Additionally, in the respective embodiments and the respective modification examples of the first embodiment, a so-called fixed position preload is adopted in which a preload is applied by fixing the first inner ring 36 and the second inner ring 46 to the shaft 20 or 220 in a state where the first inner ring 36 and the second inner ring 46 are relatively pressed in the axial direction. In contrast, for example, a so-called constant pressure preload may be adopted in which a preload is applied by providing a biasing member and by retaining the first inner ring 36 and the second inner ring 46 in a state where the first inner ring and the second inner ring are relatively pressed in the axial direction.

Additionally, the inner ring rolling surface 39 or 49 and the outer ring rolling surface 34 or 44 in the respective embodiments and the respective modification examples of the first embodiment are respectively formed in the shape of a curved surface whose external radius and internal radius vary gradually. In contrast, for example, the inner ring rolling surface 39 or 49 and the outer ring rolling surface 34 or 44 may partially include a planar portion.

In addition, the constituent elements in the above-described embodiments can be substituted with well-known constituent elements without departing from the scope of the invention.

What is claimed is:

1. A bearing device comprising:
   a shaft; and
   a pair of rolling bearing portions that are arranged side by side in an axial direction of the shaft,
   wherein the pair of rolling bearing portions each include an inner ring that is arranged coaxially with a central axis of the shaft; an outer ring that surrounds the inner ring from an outer side of the shaft in a radial direction; and a plurality of rolling elements that are rollably retained between the inner ring and the outer ring,
   wherein when a separation distance between an innermost portion of the rolling elements in the radial direction and the central axis is defined as a first separation distance and a separation distance between an outermost portion of the rolling elements in the radial direction and the central axis is defined as a second separation distance, the inner rings of the pair of rolling bearing portions each include an inner ring rolling surface formed so that the external radius of an inner end portion in the axial direction is smaller than the first separation distance and formed so as to have an external radius that becomes larger than the first separation distance from an inner side toward an outer side in the axial direction, and the outer rings of the pair of rolling bearing portions each include an outer ring rolling surface formed so that the internal radius of an outer end portion in the axial direction is larger than the second separation distance and formed so as to have an internal radius that becomes smaller than the second separation distance from the outer side toward inner side in the axial direction, and
   wherein the outer rings of the pair of rolling bearing portions are formed integrally with each other.

2. The bearing device according to claim 1, wherein the outer end portion of the outer ring in the axial direction is arranged further toward the inner side in the axial direction than an outer end portion of the inner ring in the axial direction.

3. The bearing device according to claim 1, wherein a distance from an imaginary plane including the center of the plurality of rolling elements to the inner end portion of the inner ring in the axial direction is formed so as to become shorter than a distance from the imaginary plane to an outer end portion of the inner ring in the axial direction.

4. The bearing device according to claim 1, wherein any one inner ring of the inner rings of the pair of rolling bearing portions, and the shaft are formed integrally with each other.

5. The bearing device according to claim 1, wherein the inner ring and the outer ring are formed by forging.

6. The bearing device according to claim 1, further comprising:
   a retainer that is arranged between the inner ring and the outer ring and that is capable of rollably retaining and annularly and equally arranging the plurality of rolling elements,
   wherein the retainer includes a body portion, and a plurality of claw portion pairs that are erected in the axial direction from the body portion and rollably retain the rolling elements, and
   wherein the body portion is arranged further toward the inner side in the axial direction than the rolling elements.

7. A method of manufacturing the bearing device according to claim 1, comprising:
   a first inner ring arranging step of inserting a first inner ring out of the inner rings of the pair of rolling bearing portions into the shaft and arranging the first inner ring on one side in the axial direction;
   a retainer retaining step of making each of a first retainer and a second retainer capable of retaining the rolling elements rollably retain and equally and annularly arrange the plurality of rolling elements;
   a first rolling element arranging step of inserting the plurality of rolling elements into the first inner ring together with the first retainer from the other side in the axial direction and placing the plurality of rolling elements on the inner ring rolling surface of the first inner ring;
   an outer ring arranging step of inserting the outer ring into the first inner ring from the other side in the axial direction;
   a second rolling element arranging step of inserting the plurality of rolling elements into the outer ring together with the second retainer from the other side in the axial direction and placing the plurality of rolling elements on the outer ring rolling surface on the other side in the axial direction;
   a second inner ring arranging step of inserting a second inner ring out of the inner rings of the pair of rolling bearing portions into the shaft and arranging the second inner ring on the other side in the axial direction; and
   a preload applying step of fixing the first inner ring and the second inner ring to the shaft while relatively pressing the first inner ring and the second inner ring in the axial direction.

8. An information recording/reproducing apparatus comprising:
   the bearing device according to claim 1;
   a housing that supports one end portion of the bearing device;
   a rotating member that is externally fitted to the outer rings and rotates around the central axis of the shaft; and
   a slider that is mounted on the rotating member and performs recording and reproducing of information with respect to a magnetic recording medium.

* * * * *